United States Patent
Churukian et al.

(10) Patent No.: US 12,145,618 B1
(45) Date of Patent: Nov. 19, 2024

(54) FOUR WHEEL STEERING ANGLE CONSTRAINTS

(71) Applicant: Zoox, Inc., Foster City, CA (US)

(72) Inventors: Zachary Stuart Churukian, San Francisco, CA (US); David Evan Zlotnik, Menlo Park, CA (US); Joseph Funke, Redwood City, CA (US)

(73) Assignee: Zoox, Inc., Foster City, CA (US)

( * ) Notice: Subject to any disclaimer, the term of this patent is extended or adjusted under 35 U.S.C. 154(b) by 489 days.

(21) Appl. No.: 17/502,826

(22) Filed: Oct. 15, 2021

(51) Int. Cl.
*B60W 60/00* (2020.01)

(52) U.S. Cl.
CPC ....... *B60W 60/001* (2020.02); *B60W 2552/15* (2020.02); *B60W 2552/30* (2020.02); *B60W 2710/207* (2013.01)

(58) Field of Classification Search
CPC .......... B60W 60/001; B60W 2552/30; B60W 2552/15; B60W 2710/207
See application file for complete search history.

(56) References Cited

U.S. PATENT DOCUMENTS

| 2016/0313737 | A1* | 10/2016 | Berkemeier | ......... G05D 1/0212 |
| 2018/0354334 | A1* | 12/2018 | Schindler | ............... G06V 20/56 |
| 2019/0322313 | A1 | 10/2019 | Münch | |
| 2022/0009547 | A1 | 1/2022 | Osajima et al. | |

OTHER PUBLICATIONS

Office Action for U.S. Appl. No. 17/502,843, mailed on Jun. 23, 2023, Zachary Stuart Churukian, "Four Wheel Steering Angle Constraints", 14 pages.

* cited by examiner

*Primary Examiner* — Aryan E Weisenfeld
*Assistant Examiner* — Jeffrey R Chalhoub
(74) *Attorney, Agent, or Firm* — Lee & Hayes, P.C.

(57) ABSTRACT

Four-wheel steering of a vehicle, e.g., in which leading wheels and trailing wheels are steered independently of each other, can provide improved maneuverability and stability. Steering angle constraints may be used to limit or prevent saturation of steering by only one set of wheels as well as to reduce sideslip. The steering angle constraints are vehicle independent and applicable across a fleet of different vehicles based on vehicle speed. For instance, the steering angle constraints establish angle limits that dynamically adjust based on vehicle speed to ensure vehicle velocity and acceleration remain within predefined limits as established by autonomous vehicle system design.

20 Claims, 6 Drawing Sheets

FOUR WHEEL STEERING ANGLE CONSTRAINTS

BACKGROUND

Some vehicle systems provide for independent steering of front and rear wheels, often referred to as four-wheel steering. Four-wheels steering provides benefits over a two-wheel steering design. For instance, four-wheel steering may provide greater maneuverability and/or stability than conventional two-wheel steering systems in certain circumstances. However, four-wheel steering can also introduce additional complexity to control the vehicle for safe and stable operation.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

Figure 1:
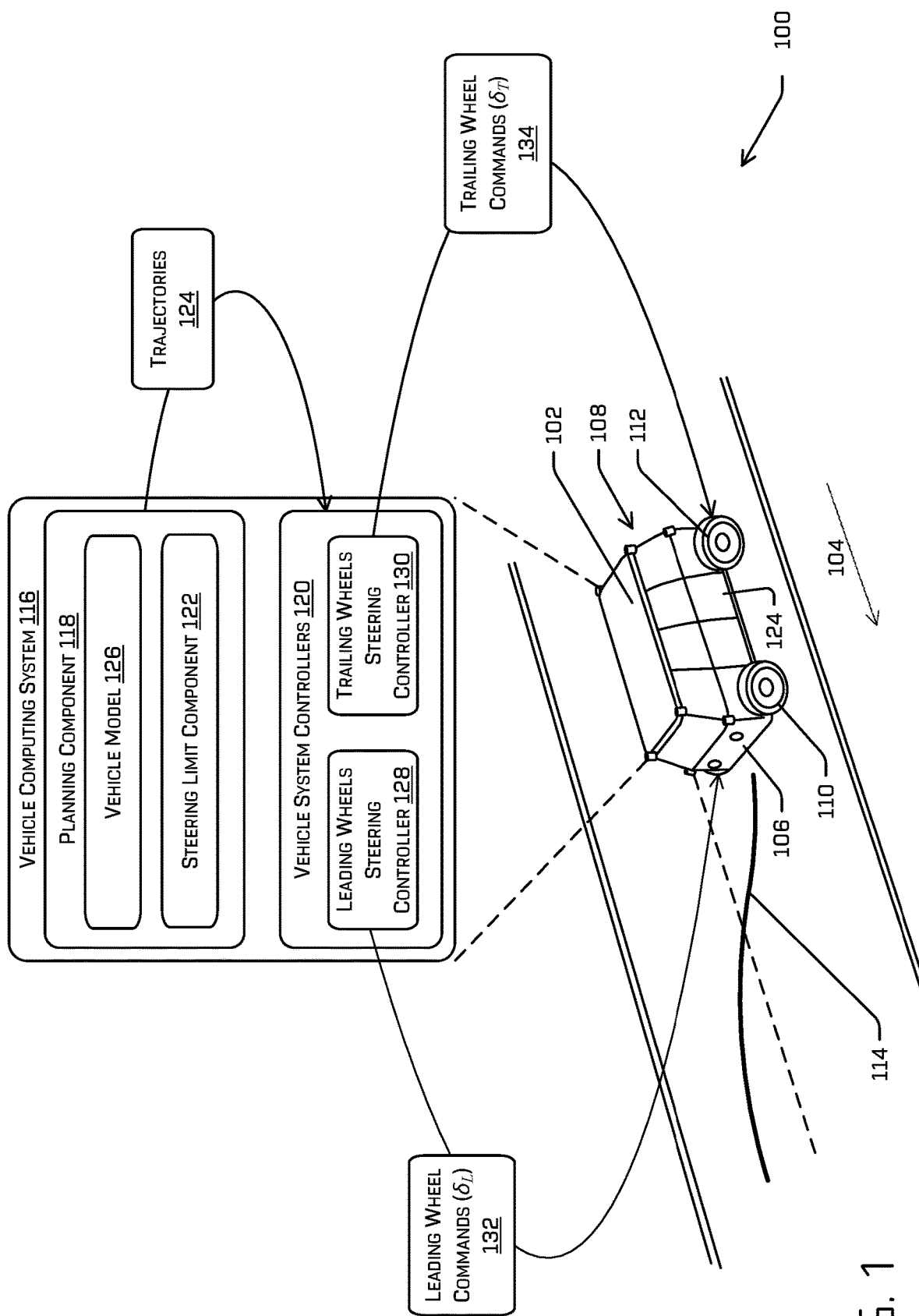
FIG. 1 includes a perspective view of an example vehicle and a schematic depiction of a portion of an example four-wheel steering system, according to at least some examples.

The description herein is generally directed to systems and techniques for controlling steering for a vehicle. In some examples, the techniques discussed herein may include controlling steering for a first subset of wheels of the vehicle according to first controls and controlling steering for a second subset of wheels of the vehicle according to second controls, with control of each subset of wheels subject to constraints on steering angles dynamically determined based on vehicle speed, trajectory, operational domain, and/or other conditions. For example, in some instances regardless of an orientation of the vehicle, the leading wheels can be steered according to a first steering angle and the trailing wheels can be steered according to a second steering angle.

Examples described herein include one or more vehicle computing systems executing a planning component to determining one or more trajectories for the four-wheel steering capable vehicle. For instance, the planning component may determine trajectories using a kinematic vehicle model. Using this kinematic vehicle model, the planning component may output a planned trajectory that may be used to determine steering angles to achieve the planned trajectory while taking into account the constraints on steering angles. The kinematic vehicle model may also account for steering using a balance of leading and trailing wheels. In some examples, the kinematic vehicle model may also apply dynamic constraints to reduce or eliminate sideslip.

Examples described herein provide for controlling an autonomous vehicle using steering constraints to constrain the steering angles and control parameters of the autonomous vehicle. The steering angle limits are determined dynamically based on a speed of the autonomous vehicle, such as by generating a limit lookup table based on different vehicle speeds and accessing the steering angle limits to control the autonomous vehicle. Though examples herein may be described with respect to speeds and steering angles, in some examples the limits may be related to steering angle rate, acceleration, jolt, and other controllable parameters of the autonomous vehicle.

The examples herein describe vehicles storing a set of precomputed steering limits specific to that vehicle. In an embodiment, the vehicle may store motion constraints, such as curvature and curvature rate, and the vehicle controller may determine appropriate steering limits based on the motion constraints.

The examples herein may describe generating a path for the autonomous vehicle using a planner of the autonomous vehicle. The examples describe generating a first curvature function defining a path curvature of the autonomous vehicle as a function of a speed for the autonomous vehicle by setting the path curvature to a maximum value based on a vehicle type of the autonomous vehicle. A curvature rate function may also be determined defining an allowable change in curvature as a function of speed for the autonomous vehicle by setting a first curvature rate to a maximum allowable rate based on a vehicle type of the autonomous vehicle. The first curvature function may be adjusted, or have a limit adjusted such that the slope of the first curvature function at a first speed exceeds a value of the curvature rate function at the first speed. The adjusted curvature function may then be used to generate the steering angle limits by determining a leading angle limit (e.g. for leading wheels) for a leading steering angle by using the adjusted curvature function. Similarly, a trailing angle limit for a trailing steering angle may be added to the limit lookup table based on a difference between the leading angle limit and the trailing angle limit being less than a first threshold. In some examples, a sideslip limit may be used to further adjust the limit lookup table to reduce and/or eliminate vehicle sideslip based on a sum of the leading steering angle and the trailing steering angle being less than a threshold. In some examples, the limit lookup table may be used to control the leading wheels and the trailing wheels of the autonomous vehicle to provide for comfort, stability, and reduced sideslip of the autonomous vehicle.

Also in aspects described herein, the vehicle computing system(s) can cause the vehicle to execute the trajectories determined by the planning component. For instance, the vehicle computing system(s), e.g., executing a tracking system, can generate one or more of feedforward steering angles, feedback steering angles, and limit steering angles to determine a leading wheel steering angle and a trailing wheel steering angle to execute the trajectories. In an embodiment, the planning component and the tracking system may use different models for steering and tracking the vehicle. In implementations, the vehicle includes a first steering controller for controlling steering of the leading wheels, e.g., according to the leading wheel steering angle, and a second steering controller for controlling steering of the trailing wheels, e.g., according to the trailing wheel steering angle.

In some instances, the leading and trailing steering angles may also be based at least in part on a ratio between the trailing steering angle and the leading steering angle. For example, at relatively lower velocities, a ratio of the trailing steering angle to the leading steering angle may be negative. At lower speeds, the negative ratio may provide greater maneuverability. At relatively higher velocities, a ratio of the trailing steering angle to the leading steering angle may be positive. At high speeds, the positive ratio may provide greater stability.

Systems and techniques described herein can provide many benefits. For instance, the four-wheel steering systems described herein can provide increased functionality relative to two-wheel steering systems. For instance, at lower speeds four-wheel steering systems can provide greater maneuverability, e.g., by providing a higher effective turning radius. At relatively higher speeds, four-wheel steering systems can provide great stability during steering. Because of these benefits, a passenger experience, including safety outcomes, can be improved. The systems and techniques enable use of a single set of limits based on path curvature for an entire fleet of vehicles including different vehicle types and configurations. Though described herein with respect to path curvature and curvature rate, the systems and techniques herein may be based on other defined limits such as yaw rate or other vehicle agnostic parameters that may be defined across a fleet of vehicles and vehicle types. The path curvature-based limits may be converted to a steering angle at a vehicle-level, enabling use of the single set of constraints without establishing constraints for each vehicle type. This flexibility enables use of a variety of vehicle and addition of different vehicle types to a fleet without re-establishing steering angle limits for the fleet. The systems and techniques can also be readily integrated into existing vehicles. For example, while existing autonomous vehicles may be controlled using two-wheel steering, and thus the control infrastructure of such vehicles is developed for two-wheel steering, the systems and techniques described herein can be readily integrated into these existing systems. The systems and techniques herein provide for reducing and/or eliminating sideslip on wheels of the autonomous vehicle and also ensures safety and comfort of passengers within the autonomous vehicle. Other features and benefits are also apparent from the following description.

The techniques and systems described herein may be implemented in a number of ways. Example implementations are provided below with reference to the figures.

FIG. 1 shows an environment 100 through which a vehicle 102 is traveling. The vehicle 102 may be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 102 may be configured to control all functions from start to completion of the trip, including all parking functions, it may not include a driver and/or controls for driving the vehicle 102, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times to those that are partially-or fully-autonomous.

The vehicle 102 may be any configuration of vehicle, such as, for example, a van, a sport utility vehicle, a cross-over vehicle, a truck, a bus, an agricultural vehicle, or a construction vehicle. The vehicle 102 may be powered by one or more internal combustion engines, one or more electric motors, hydrogen power, any combination thereof, and/or any other suitable power sources. In the illustrated example, the vehicle 102 is generally travelling in the direction indicated by arrow 104. Accordingly, a first end 106 of the vehicle 102 is a front or leading end, and an opposite, second end 108 of the vehicle 102 is a rear or trailing end. The example vehicle also includes two leading wheels 110 (of which only one is labelled) and two trailing wheels 112 (of which only one is labelled). Although the example vehicle 102 has four wheels, the systems and methods described herein may be incorporated into vehicles having fewer or a greater number of wheels and/or tires.

In implementations of this disclosure, the vehicle 102 has four-wheel steering, such that both the leading wheels 110 and the trailing wheels 112 are steerable independently, e.g., relative to each other and/or relative to the vehicle 102. The four-wheel steering may facilitate bidirectionality, such that the vehicle 102 may operate generally with equal performance characteristics in all directions. For instance, as shown in FIG. 1, the first end 106 of the vehicle 102 is the front end of the vehicle 102 when travelling forward in the direction shown by the arrow 104, but the vehicle 102 may also travel forward in the opposite direction, e.g., with the first end 106 as the rear end of the vehicle 102. Similarly, the second end 108 of the vehicle 102 is the rear end of the vehicle 102 when travelling in the direction of the arrow 104, and the second end 108 is the front end of the vehicle 102 when travelling forward in the direction that is the opposite of the arrow 104.

In some conventional vehicles that include four-wheel steering, the vehicle 102 may still be controlled generally as a vehicle with two-wheel steering. For instance, when the first end 106 is the front or leading end, as in FIG. 1, the leading wheels 110 may be steered, whereas the trailing wheels 112 are fixed. Similarly, when the second end 108 is the leading end of the vehicle 102, the leading wheels 110 may be fixed and the trailing wheels 112 may be steered. However, aspects of this disclosure involve steering both the leading wheels 110 and the trailing wheels 112 to provide true four-wheel steering. Specifically, in the illustration of FIG. 1, both the leading wheels 110 and the trailing wheels 112 are steering the vehicle 102 to maintain a heading along a path 114, e.g., to implement a lane-change. The path 114 can be a visualization associated with a trajectory along which the vehicle 102 is to travel, as detailed further herein. In some instances, using four-wheel steering as shown in FIG. 1 can provide added stability, e.g., at higher speeds. Four-wheel steering may also facilitate greater maneuverability, for example, by increasing an effective turning radius of the vehicle 102 in small spaces or crowded environments.

FIG. 1 also includes a block diagram of a vehicle computing system 116 used to implement four-wheel steering at the vehicle 102. For example, the vehicle computing system 116 includes a planning component 118, vehicle system controllers 120, and a steering limit component 122. For ease of understanding, components of the vehicle computing system 116 are shown and described as separate components, although aspects of the illustrated components may be shared and/or additional components may be included for carrying out functionality described herein and attributed to the illustrated components.

The planning component 118 is generally configured to generate trajectories 124. For example, the planning component 118 of the vehicle 102 may include instructions stored on a memory that, when executed by processor(s), configure the processor(s) to generate data representative of one or more trajectories of the vehicle 102. The planning component 118 can receive data representing a location of the vehicle 102 in its environment and other data, such as local pose data, and the planning component 118 can use such data to generate the trajectories 124. Individual of the trajectories 124 may include a position or pose to which the planning component 118 instructs the vehicle 102 to move, e.g., along the path 114. For instance, the trajectories 124 can include one or more vehicle states at one or more locations along the path 114. In some examples, the planning component 118 may also be configured to determine projected positions and/or poses, e.g., as additional trajectories, predicted to be executed by the vehicle 102. In some examples, the planning component 118 may substantially continuously (e.g., every 1 or 2 milliseconds) generate a plurality of potential trajectories with which to control the vehicle 102 and may select the trajectories 124 from these candidate trajectories. The selection may be based at least in part on a desired destination, a current route, a drive mode, a current vehicle trajectory, and/or object trajectory data (e.g., of one or more objects in the environment 100). Upon generating and/or selecting the trajectories 124, the planning component 118 may transmit the trajectories 124 to the vehicle system controllers 120, e.g., as a reference trajectory command to control the vehicle 102.

As illustrated in FIG. 1, the planning component 118 includes a vehicle model 126, and the vehicle model 126 is used to determine the trajectories 124. In examples, the vehicle model 126 is a kinematic model of the vehicle 102. The kinematic model may be chosen for its relative simplicity, which allows for the planning component 118 to generate the trajectories 124 at a relatively high frequency and with relatively reduced computational resources.

The vehicle model 126 may include details regarding the dimensions and characteristics of the vehicle 102. In some examples, the vehicle model 126 includes information useful for converting limits universal to all vehicle models to a particular vehicle model. In some examples, the characteristics may include dimensions of the wheelbase, distance from a center of the vehicle 102 to the trailing wheels 112 and the leading wheels 110.

Assuming a wheelbase of the vehicle 102 is the distance between the first axis and the second axis, the vehicle model 126 may assume a two-wheel steering model for a vehicle having half the actual wheelbase of the vehicle 102. Accordingly, conventional planning programming and systems, e.g., for two-wheel (front-wheel) steering vehicles, can be implemented for the four-wheel steering of the vehicle 102 by modeling the vehicle 102 as having half its actual wheelbase. Implicitly, this model assumes that the vehicle 102 has mirrored steering about a lateral axis at the half-wheelbase. That is, in the vehicle model 126, if the leading wheels are turned 10-degrees in a first direction, the trailing wheels would be turned 10-degrees in the opposite direction.

The trajectories 124 are generated by the planning component 118 based on the vehicle model 126. For instance, the planning component 118 may receive a current state of the vehicle, e.g., including a steering angle of the leading wheels 110. The planning component 118, using the vehicle model 126, can determine an updated leading wheel steering angle and an acceleration for the vehicle 102 to perform as desired, e.g., to attain a desired destination or state. Moreover, by integrating the steering and acceleration commands forward, additional vehicle states can be determined for future times. Thus, the trajectories 124 can include information about one or more of these vehicle states, e.g., position(s) of the vehicle 102, yaw rate(s) associated with the vehicle 102 at the position(s), velocity(ies) at the position(s), or the like, as well as the steering commands and acceleration commands associated with the positions. In examples of this disclosure, the steering commands may include only steering commands for the leading wheels, only steering commands for the trailing wheels, or steering commands for both the leading wheels and the trailing wheels. In examples, however, only the leading steering angles may be included in the trajectories 124. As noted above, in implementations of the vehicle model 126, the rear steering commands are the opposite, e.g., the additive inverse, of the front steering commands. Accordingly, by outputting only the front steering angle, functionality of the planning component 118 can be similar to that of a conventional planning system used for two-wheel steering. Moreover, other vehicle models may be used as the vehicle model 126, including models in which the trailing steering angle is not necessarily the additive inverse.

The vehicle system controllers 120 can receive the trajectories 124 and perform actions to implement the trajectories 124. Specifically, the vehicle system controllers 120 may include instructions stored on a memory that, when executed, cause any number of controllers to control aspects of the vehicle 102. FIG. 1 specifically shows a leading wheels steering controller 128 and a trailing wheels steering controller 130. As described herein, the vehicle 102 is configured for four-wheel steering, such that the leading wheels 110 are steerable independently of the trailing wheels 112, and vice versa. Accordingly, and as illustrated, the leading wheels steering controller 128 is configured to generate one or more leading wheel commands 132, e.g., as leading wheels steering angles $\delta_L$ for the leading wheels 110, and the trailing wheels steering controller 130 is configured to generate one or more trailing wheel commands 134, e.g., as trailing wheels steering angles $\delta_T$ for the trailing wheels 112.

Although FIG. 1 shows the vehicle system controllers 120 as including only the leading wheels steering controller 128 and the trailing wheels steering controller 130, the vehicle system controllers 120 will include additional controllers for controlling additional aspects of the vehicle 102. Without limitation, and as discussed above, the trajectories 124 may include information about an acceleration of the vehicle 102. A not-illustrated controller of the vehicle system controllers 120 may control an acceleration of the vehicle 102. Thus, in some implementations, the vehicle system controllers 120 may receive the trajectories 124 generated by the planning component 118 and control aspects of the vehicle 102 to implement the trajectories 124. As noted above, in some implementations of this disclosure, the trajectories 124 may include only leading wheels steering commands, e.g., corresponding to the leading wheels steering angle $\delta_L$. The vehicle model 126 implicitly assumes the trailing wheels steering angle $\delta_T$ to be the additive inverse of the leading wheels steering angle $\delta_L$, so in some examples, the trailing wheels steering controller 130 may generate trailing wheel commands 134 to cause the trailing wheels 112 to mirror, e.g. about a lateral axis of the vehicle 102, the steering instructed by the leading wheel commands 132. However, in some examples it may be desirable to have the trailing wheels 112 steered other than opposite the leading wheels 110. In the illustration of FIG. 1, the trailing wheels 112 are steered at approximately the same angle as the leading wheels 110.

In some instances, the vehicle system controllers 120, and more specifically, the leading wheels steering controller 128 and/or the trailing wheels steering controller 130, may be configured to determine the leading wheel commands 132 and/or the trailing wheel commands 134 from the trajectories 124 and the steering limits from the steering limit component 122. In other implementations, however, the vehicle system controllers 120 may include functionality to continuously execute the trajectories 124, e.g., by generating tracking commands, as the leading wheel commands 132 and/or the trailing wheel commands 134 in response to real-time or near real-time data from the vehicle 102, e.g., received and/or generated as sensor data 136.

The steering limit component 122 is pictured contained within the planning component 118, but may be embodied in other locations, such as on a remote computing device or other system of the vehicle 102. The steering limit component 122 is generally configured to include dynamic limits for steering angles for the vehicle 102 that may be converted, using the vehicle model 126 to determine the steering angle of the leading wheel and the trailing wheel. For example, the steering limit component 122 may include a lookup table including curvature data relating to maximum allowable curvature at various speeds of the vehicle 102. The lookup table may also include data corresponding to a change in curvature allowable at various speeds or other information relating to control of the vehicle 102 and allowable limits for the control parameters at different speeds or operating states of the vehicle 102. In some examples, the steering limit component 122 may include one or more functions that describe the curvature limits for the vehicle 102. The steering limit component 122 and the lookup table may be generated as described herein, including defining a curvature function and curvature rate function in addition to other limitations such as a sideslip limitation and a difference in the steering angles between the leading and trailing angles. The planning component 118 may use the steering limit component 122 in addition to the vehicle model 126 to generate the trajectories 124.

In some examples, the steering limit component 122 may include limits related to different constraints in different scenarios, such as relating to city driving, highway driving, weather conditions, vehicle faults, and other such driving conditions and environments. In such examples, the steering limit component 122 may include multiple lookup tables or multiple functions, each relating to different driving conditions and selected based on input from sensors of the vehicle 102 indicative of the environment the vehicle 102 is operating within. In some examples, the limits may include limits related to velocity, acceleration, jolt, torque, energy usage, or other such limits. The planning component 118 may use the limits from the steering limit component 122 to generate the trajectories. In some examples, the planning component 118 may include an audit log that monitors, in real-time, the steering angles of the vehicle 102 and compares the recorded steering angles and the speed of the vehicle against the data of the steering limit component 122.

Figure 2:
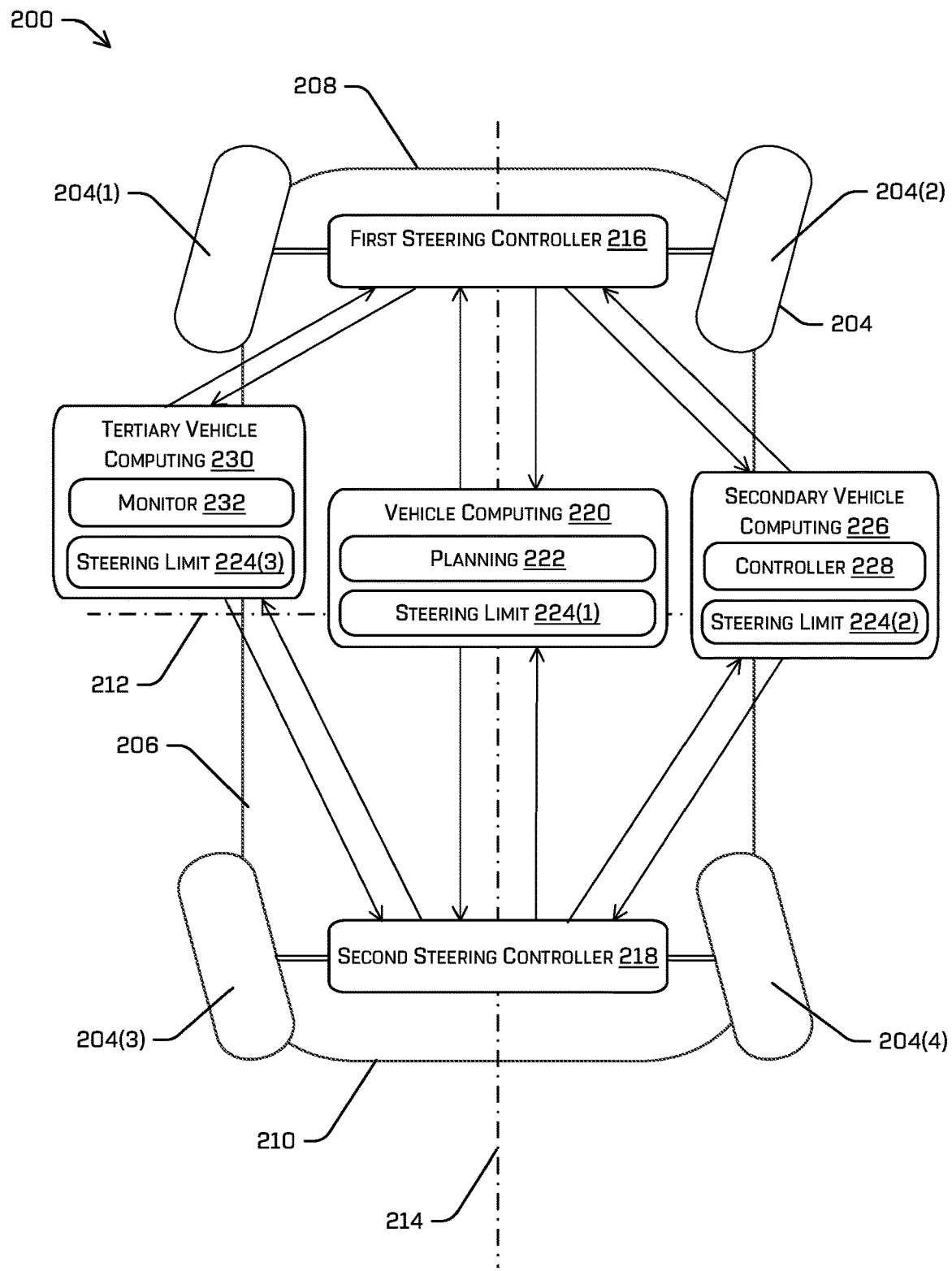
FIG. 2 is a schematic top view of an example vehicle including an example steering control system with steering angle constraints, according to at least some examples.

FIG. 2 is a schematic top view of a vehicle 200, which may correspond to the vehicle 102 shown in FIG. 1. As illustrated, the vehicle 200 includes a first wheel 204(1), a second wheel 204(2), a third wheel 204(3), and a fourth wheel 204(4) (collectively, herein, "the wheels 204") arranged proximate corners of the vehicle 200. For instance, a frame 206 of the vehicle 200 may define a generally rectangular shape, with the wheels 204 arranged proximate corners thereof. More specifically, the first wheel 204(1) and the second wheel 204(2) are relatively closer to a first end 208 of the vehicle and the third wheel 204(3) and the fourth wheel 204(4) are relatively closer to an opposite, second end 210 of the vehicle 200. In the example, the first wheel 204(1) and the second wheel 204(2) are spaced a first distance from a lateral axis 212 of the vehicle 200 and the third wheel 204(3) and the fourth wheel 204(4) are spaced an equal distance from the lateral axis 212. Moreover, the first wheel 204(1) and the second wheel 204(2) are equidistant from a longitudinal axis 214 of the vehicle 200. Similarly, the third wheel 204(3) and the fourth wheel 204(4) are equidistant from the longitudinal axis 214.

As also illustrated in FIG. 2, the vehicle 200 includes a first steering controller 216 associated with the first wheel 204(1) and the second wheel 204(2) and a second steering controller 218 associated with the third wheel 204(3) in the fourth wheel 204(4). In examples, the first steering controller 216 may be one of the leading wheels steering controller 128 or the trailing wheels steering controller 130 discussed above with reference to FIG. 1. The second steering controller 218 may be the other of the leading wheels steering controller 128 and the trailing wheels steering controller 130.

Although the first steering controller 216 is illustrated as being associated with both the first wheel 204(1) and the second wheel 204(2), and the second steering controller 218 is illustrated as being associated with both the third wheel 204(3) and the fourth wheel 204(4), this is for example only. In other examples, each of the wheels 204 may have its own steering controller. Although implementations of this disclosure include implementing a first steering angle for leading wheels of a vehicle, such as the vehicle 200, and a second steering command for trailing wheels of the vehicle, such controls may be implemented through individual steering controllers at the wheels. Moreover, by controlling each of the wheels 204 independently of all other wheels, the vehicle 200 may be provided with greater maneuverability. Without limitation, while the vehicle 200 is intended to generally move forward in either direction along the longitudinal axis 214, in other instances, the vehicle may move generally forward in either direction along the lateral axis 212. Such maneuverability may be facilitated by executing a first steering angle at the second wheel 204(2) and the fourth wheel 204(4) and a second steering angle at the first wheel 204(1) and the third wheel 204(3).

The vehicle 200 also includes a vehicle computing system 220, which may be the same as or similar to the vehicle computing system 116 discussed above in connection with FIG. 1. As schematically illustrated, the vehicle computing system 220 can include a planning component 222 and a steering limit component 224. The planning component 222 may include the same functionality as the planning component 118, and the steering limit component 224 may include the same functionality as the steering limit component 122, discussed above. The vehicle computing system 220 may be in communication with the first steering controller 216 and the second steering controller 218, e.g., to provide control commands and/or to receive information from the respective steering controllers.

As detailed herein, the planning component 222 may be configured to determine trajectories, like the trajectories 124, using a first model of the vehicle 200. In some examples, the first model is a kinematic vehicle model and is used to determine a series of vehicle states for the vehicle 200. These states may be used by the vehicle computing system 220, which, along with the first steering controller 216 and the second steering controller 218, implement the trajectories. In examples, the vehicle computing system 220 can determine a first steering angle, e.g., to be implemented by the first steering controller 216 at the first wheel 204(1) and the second wheel 204(2), and a second steering angle, e.g., to be implemented by the second steering controller 218 at the third wheel 204(3) and the fourth wheel 204(4). The vehicle computing system 220 may implement a second vehicle model, e.g., a dynamic vehicle model, to determine the first and second steering angles. In examples, the second model can be applied iteratively to continuously update the steering angles, e.g., in real-time or near real-time.

In some examples, the planning component 220 may use a kinematic model of the vehicle 200 to determine leading and trailing angles. The kinematic vehicle model may assume zero lateral velocity, that is, no sideslip for the vehicle, at a point representing the vehicle. The point may be equidistant from a first axle through the leading wheels of the vehicle and a second axle through the trailing wheels of the vehicle. Using this kinematic vehicle model, the planning component may determine a first steering angle for leading wheels of the vehicle to navigate to a destination, e.g., based on a current state of the vehicle. In examples, the planning component can determine a series of vehicle states, including leading wheel steering angles, as a trajectory. The kinematic vehicle model assumes zero lateral velocity, and thus implicitly that the trailing steering angle is the additive inverse of the leading steering angle. Stated differently, the kinematic vehicle model assumes mirrored steering for the vehicle, e.g., about a lateral axis through the point representing the vehicle.

The vehicle 200 also includes a secondary computing system 226, which may be the same as or similar to the vehicle computing system 116 or the vehicle computing system 220. In some examples, the secondary computing system 226 may be an executive motive unit (EMU) in communication with the vehicle 200 over a CAN bus. In some examples, the vehicle computing system 220 may be a first computing system that implements a planner, as described above with respect to the planning component 222 while the secondary computing system 226 is associated with a controller 228 that implements and conveys control signals to the first steering controller 216 and the second steering controller 218.

The controller 228 implemented on the secondary computing system 226 may include a dynamic model of the vehicle 200 that may be used to calculating commands and conveying the control commands to the steering controllers. In some examples, the controller 228 can determine the leading and trailing wheel steering angles based at least in part on a dynamic model of the vehicle. In some examples, the model used by the vehicle computing system 220 may be a low first model, such as a low-fidelity model used to generate rough trajectories for the vehicle while the secondary computing system 226 may use a second, high-fidelity model. Thus, while the planning component 222 may use a first, kinematic model of the vehicle to determine trajectories, the controller 228 may use a second, dynamic model of the vehicle to control the vehicle to follow the trajectories. Like the first model, the dynamic model may also assume zero lateral velocity, or zero sideslip of the vehicle to determine the leading and trailing steering angles. In examples, the controller 228, executing the dynamic model, may determine a feedforward command based on a current state of the vehicle 200 relative to a state determined by the trajectory. The controller 228 may also determine a feedback command based at least in part on a tracking error of the vehicle, e.g., one or more differences between a current state of the vehicle 200 and the trajectory. In at least some examples, the tracking error includes a lateral offset and/or a heading error. The dynamic model may determine the leading steering angle and the trailing steering angle as steering angles to eliminate the tracking error.

In at least one example, the vehicle 200 may include the secondary computing system 226 and a tertiary computing system 230 to provide redundancy, error checking, and/or validation of determinations and/or commands determined by the vehicle computing system 220. By way of example, the vehicle computing system 220 may be considered to be a primary system, while the secondary computing system 226 may be considered to be a secondary system. The primary system may generally perform processing to control how the vehicle 200 maneuvers within an environment. The primary system may implement various Artificial Intelligence (AI) techniques, such as machine learning, to understand an environment around the vehicle 200 and/or instruct the vehicle 302 to move within the environment. For example, the primary system may implement the AI techniques to localize the vehicle 200, detect an object around the vehicle 200, segment sensor data, determine a classification of the object, predict an object track, generate a trajectory for the vehicle 200, and so on. In examples, the primary system processes data from multiple types of sensors on the vehicle 200, such as light detection and ranging (lidar) sensors, radar sensors, image sensors, depth sensors (time of flight, structured light, etc.), and the like.

In some instances, the secondary computing system 226 may validate an operation of the primary system and may take over control of the vehicle 200 from the primary system when there is a problem with the primary system. In some examples, the vehicle also includes a tertiary computing system 230 which may provide additional backup functionality and monitoring capability. The backup systems, the secondary computing system 226 and the tertiary computing system 230 may be built to be more resilient by being less sophisticated, for example by having limited functionality.

The vehicle 200 also includes a tertiary computing system 230, which may be same as or similar to the other vehicle computing systems described herein. In some examples, the tertiary computing system 230 may be a robust or backup computing system that provides monitoring functionality but is limited in scope, so as to provide a robust hardware set capable of operating without much susceptibility to variability or crashing. In some examples, the monitoring component 232 may use a dynamic model of the vehicle similar to the dynamic model of the controller 228. In some examples, the tertiary computing system 230 may be a microprocessor or other purpose-built computing system. In some examples, the vehicle computing system 220 may have a first robustness, the secondary computing system 226 may have a second robustness, and the tertiary computing system may have a third robustness, with the tertiary computing system 230 the most robust and stable of the systems. The tertiary computing system 230 may be configured to monitor, through a monitoring component 232 the steering angles of the leading and trailing wheels as controls are executed. In some examples, the monitoring component 232 may be used to audit operation of the vehicle and ensure steering angles remain within steering limits. In some examples, the vehicle computing system 220, secondary computing system 226, and tertiary computing system 230 may be implemented on separate hardware in communication over a communication network (e.g., CAN bus) of the vehicle. In some examples, the computing systems may be implemented in a single hardware device with separate modules or components to perform the actions of the planning component 222, controller 228, and monitor 232.

The vehicle computing system 220, secondary computing system 226, and the tertiary computing system may each access or have local copies of the steering limits 224 available for use by the different components. For example, the steering limit 224(1) may be stored locally on the vehicle computing system 220 after being generated offline. In some examples, the steering limit 224(1) may be stored remotely, either on a separate storage device connected with the vehicle 200 or over a network connection to a remote computing device. Similarly, the steering limits 224(2) and 224(3) may be accessed by the computing systems or locally stored on each.

During operation of the vehicle 200, the vehicle computing system 220 implements the planning component 222 to plan a path of the vehicle 200 based on a destination as described herein. In planning the path of the vehicle 200, the planning component 222 accesses the steering limits 224(1) as part of trajectory generation for steering control of the wheels of the vehicle. For example, the planning component 222 may run a trajectory tracker that generates one or more trajectories for the vehicle 200 to navigate to the destination. The planning component may convert the trajectories into desired steering commands and use the accessed steering limits 224(1) to ensure that the steering commands are within the limits.

During operation, the secondary computing system 226 implements the controller 228 to model, using the dynamic model or the high-fidelity vehicle model, the current state of the vehicle 200 and control operation of the steering components. The controller 228 may use the steering limits 224(2) to bound the control commands sent to the steering controllers.

The tertiary computing system 230 may operate the monitor 232 during operation of the vehicle 200 to monitor commands sent to the steering controllers as well as feedback from the steering controllers indicative of the steering angles actually achieved by each wheel. The monitor 232 may be implemented as an audit system to audit performance of the steering system and ensure the steering controls remain within bounds set by the steering limits 224.

In some examples, the planning component 222, controller 228, and monitor 232 may access different steering limits, or adjust accessed steering limits based on the actions performed by each. In an illustrative example, the steering limits 224 may include a first set of steering limits for use by the planning component 222, a second set of steering limits for the controller 228, and a third set of steering limits for the monitor 232. The different steering limits may be derived from the same base data as described herein, but may have buffers or multipliers applied based on the intended use of the steering limits. For instance, the steering limits for the planning component 222 may have an applied multiplier or buffer to reduce a range of steering control limits used by the planning component 222. The reduced range of the steering limits may account for the planning component 222 to compensate for the vehicle 200 deviating from a path during operation and enable the system to correct the deviation. In some examples, the controller 228 and the monitor 232 may similarly use steering limits having applied multipliers or buffers. For instance the monitor 232 may access steering limits having a buffer applied thereto that expands the range of the steering limits by an amount such that the monitor 232 identifies deviations that exceed the steering limits by at least the buffer amount, and not due to noise or latency in the steering angle data. Because the monitor 232 may be receiving steering angle data with some latency from the time when the planning component 222 or the controller 228 implement first steering limits, the monitor 232 may lag and therefore need to account for latency in the speed of the vehicle, that may change, to access or determine correct steering limits. Similarly, the controller 228 may access steering limit data having a multiplier or buffer applied thereto. In this manner, the different computing systems may access a shared set of steering limits but ultimately use different steering limits from the dataset for the different purposes of each system.

In some examples, the steering limits 224 may be a single set of steering limits without buffers or multipliers applied to generate different data accessed by each computing system, but the buffer or multiplier may be applied to the steering limits after accessing from the steering limits 224. For example, the planning component 222 may access the steering limits and apply a multiplier of less than one to reduce the range of the steering limits for use by the planning component 222 as described above. Similarly, the controller 228 and the monitor 232 may apply a multiplier, greater than one or less than one, or add or subtract a buffer amount from the steering limits 224 before implementing at each system.

Figure 3:
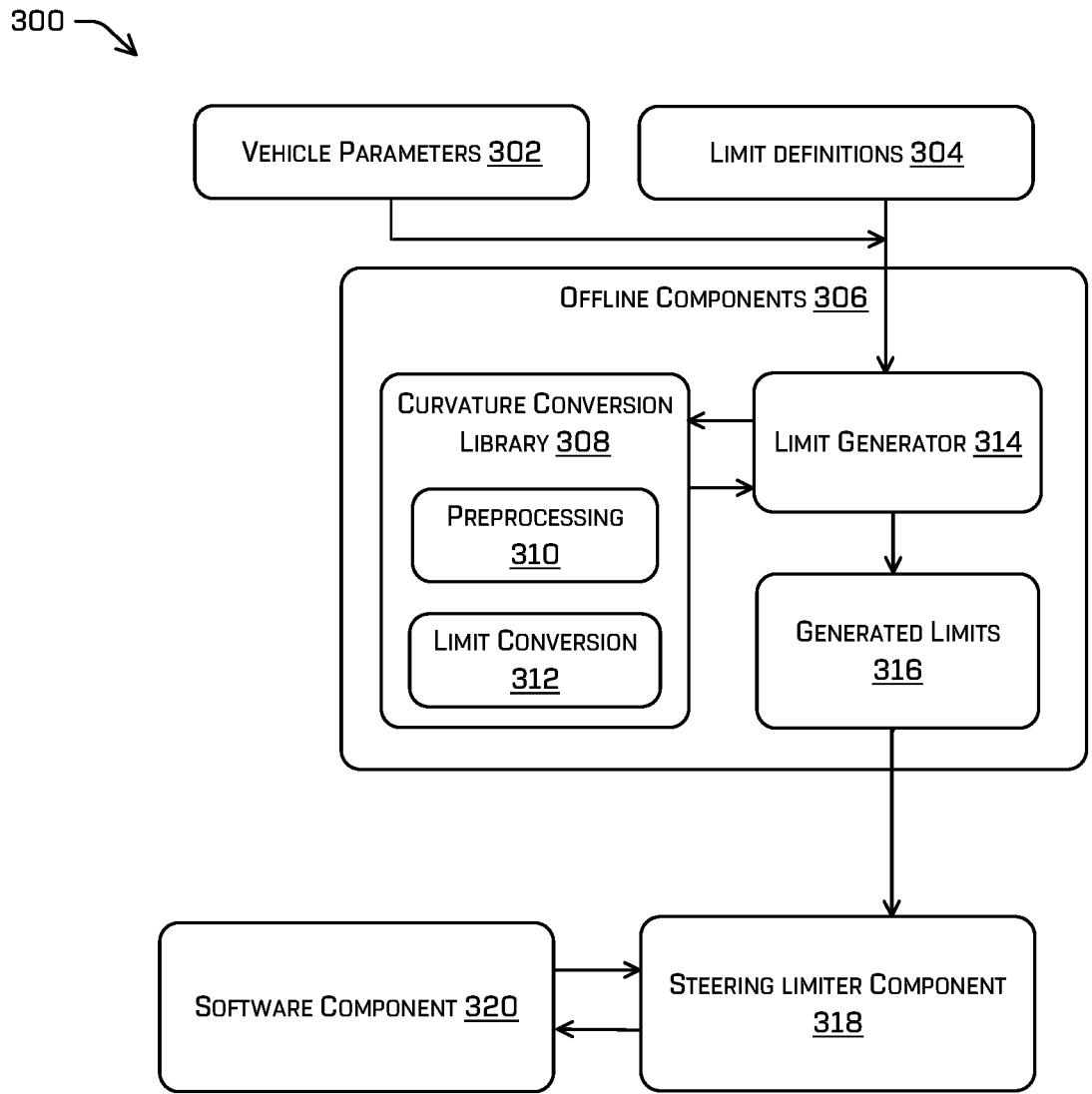
FIG. 3 is an example architecture for generating and implementing steering of a vehicle using steering limits based on path curvature, according to at least some examples.

FIG. 3 represents a system architecture 300 for generating and implementing steering of a vehicle 102 using steering limits based on path curvature. The system architecture 300 includes offline components 306 that may perform actions prior to activation of the vehicle 102 or offline of operation of the vehicle 102, and active components (e.g. steering limiter component 318 and software component 320) that operate during use of the vehicle 102 and may be implemented on the vehicle 102 or on a separate system associated or in communication with the vehicle 102.

The system architecture 300 includes vehicle parameters 302 and limit definitions 304 that may provide inputs to the limit generator 314. The limit definitions 304 may relate to the different types of limits that are established by the offline components 306, including information such as curvature definitions, velocity, acceleration, jolt, and various other parameters that may be limited for the vehicle 102. The vehicle parameters 302 provide information related to the vehicle 102 including the equipment of the vehicles, the vehicle type, the vehicle abilities, the operating status and condition of the vehicle, and the like.

The offline components 306 may be useful for generating limits for the steering limiter component 318 to use in coordination with the software component 320 to limit operation of different systems of the vehicle 102. For example, the offline components 306 may be used to generate limits for a lookup table that may be used or accessed by the steering limiter component 318. The steering limiter component 318 is in communication with the software component 320, which is embodied within the vehicle 102 and may include one or more software components that control electronic control units (ECUs) of the vehicle 102. In this manner, the steering limiter component 318 may be used to introduce limits to the software of the vehicle 102 that alter and adjust the use of the equipment on the vehicle 102.

The offline components 306 include a limit generator 314, a curvature conversion library 308, a preprocessing component 310, a limit conversion component 312, and a data store of the generated limits 316. The generated limits may be accessed by the steering limiter component and may include a lookup table or functions defining the limits for different operations, such as steering components of the vehicle 102. The limit generator 314 generates the limits by communicating with the vehicle parameters 302, the limit definitions 304, and the curvature conversion library 308. In some examples, defined curvature limits and defined curvature rate limits are input by the limit generator 314 into the curvature conversion library. The defined limits may be set by a system design and may include expert-defined or otherwise established curvature and curvature rate definitions.

The preprocessing component 310 will begin by saturating the curvature function (function defining allowable curvature as a function of speed) and setting the curvature function to a maximum value given the specific angle limits from the defined limits. The same process may be performed on the curvature rate function, to saturate the curvature rate function and thereby set the values of the function to their maximum rates. The preprocessing component 310 then resolves any inconsistencies or impossibilities that exist in the curvature and curvature rate functions. For example, it may be impossible to satisfy each of the curvature and curvature rate functions during acceleration or deceleration of the vehicle, in this manner, the possible or reachable curvature may not be a possible curvature that is within the limits set by the function. To resolve these inconsistencies, the limits of the curvature function are reduced such that the inconsistency is resolved and the curvature rate function enables changes in the curvature function without exceeding the bounds defined by each function. The limits define the maximum curvature value, and by reducing the limit, the maximum curvature that may be reached by the vehicle 102 is reduced to a range that is possible given the limitations of the curvature rate function.

The limit conversion component 312 receives the curvature and curvature rate limits from the preprocessing component 310 and, using a feedforward model, introduces bounds or limits on the front steering angle and rate of change of the steering angle. The feedforward model may be defined for a first operational domain in which two-wheel steering is employed or for a second operational domain in which four-wheel steering is employed, though the second operational domain (four-wheel steering) is discussed primarily herein. The front steering angle limit and the front steering angle rate limit are compatible with both the first operational domain and the second operational domain and bound the maximum steering angles for the leading wheels of the vehicle 102. Similarly, a rear steering angle limit and a rear steering angle rate limit is introduced that bounds the maximum steering angles and rate of change for the trailing wheels. In the first operational domain (two-wheel steering), the rear steering angle limit is zero degrees, because the rear wheels are fixed.

As used herein, an "operational domain" is a condition of the vehicle associated with a set of rules or operating constraints with which the vehicle must comply. The operational drive domain may be determined based on a location of the vehicle (e.g., on a road, at a charging station, at a maintenance facility, etc.), based on an instruction received from an operator (e.g., a service technician local to the vehicle, a remote teleoperator, etc.), based on an operating status of the vehicle (e.g., on route to a destination, in autonomous mode, in manual mode, in service, charging, etc.), and/or other factors. For example, in some instances, the vehicle may determine the location of the vehicle and control one or more settings based at least in part on the location of the vehicle. For instance, if the vehicle system determines that the vehicle is in a pickup/drop off location, the vehicle system may lower a ride height of the vehicle to make loading/unloading easier, and may automatically determine a limited range of steering angles of the vehicle associated with the lower ride height of the vehicle to avoid interference between components of the vehicle. As another example, if the vehicle system determines that the vehicle is in a location of a charging station or a location of a maintenance facility, the vehicle system may automatically raise the ride height of the vehicle to a pre-defined ride height to provide clearance to pass over physical charging contacts or other devices located beneath the vehicle and constrain the position of the steering system within a limited range of steering angles based on the pre-defined ride height to avoid interference between components of the vehicle. As yet another example, if the vehicle system determines that the vehicle is entering a parking garage, the vehicle system may lower a ride height of the vehicle to clear a ceiling of the parking garage, and may automatically determine a limited range of steering angles of the vehicle associated with the lower ride height of the vehicle to avoid interference between components of the vehicle. Additionally or alternatively, in some examples, an operational domain may be associated with a maximum range of steering angles and/or a maximum range of ride heights. For instance, in an operational domain associated with a maintenance facility and/or a command from a maintenance technician, limits on the range of steering angle and/or ride height may be removed to allow the vehicle to be controlled through its full range of steering angles and/or ride heights without regard to potential interference between vehicle components. In some examples, an operational domain may be associated with an environmental condition, such as a weather condition or a traffic condition. Furthermore, in some examples, ranges of steering angles and/or ride heights associated with an operational domain may depend at least in part on a hardware configuration of the vehicle and/or a ground clearance of the vehicle. Thus, different vehicles having different hardware configurations and/or ride heights may have different limited ranges of steering angles and/or ride heights for a given operational domain.

Additional limits related to a steering angle difference and rate difference are introduced by the limit conversion component 312 as well. The steering angle difference limits a difference between the steering angle of the leading wheels and the trailing wheels to below a predetermined threshold. These limitations, in combination with the leading and trailing steering angle limits, bound the curvature and curvature rate for the vehicle. In some examples, the limit conversion component 312 also introduces a sideslip limit based on a sum of the steering angles for the leading and trailing wheels in addition to a rate sum for the wheels. The sideslip limit enforces saturation of the rear or trailing wheels before the leading wheels and thereby reduces or limits the amount of sideslip experienced by the vehicle 102.

As described herein, the limit generator 314 may output each of the described limits as part of a lookup table with values for each limit function defined based on vehicle speed and driving conditions. For example, different lookup tables may be generated for different driving environments such as city versus highway driving or based on environmental conditions around the vehicle (weather, temperature, etc.). The functions defining the limits, curvature function and curvature rate function for example, are agnostic to vehicle type and may therefore be used for any suitable vehicle, with the limit generator 314 converting the functions by using the vehicle parameters 302 to establish specific steering angle limits or other such limits that may be directly controlled or impacted by the software component 320.

Figure 4:
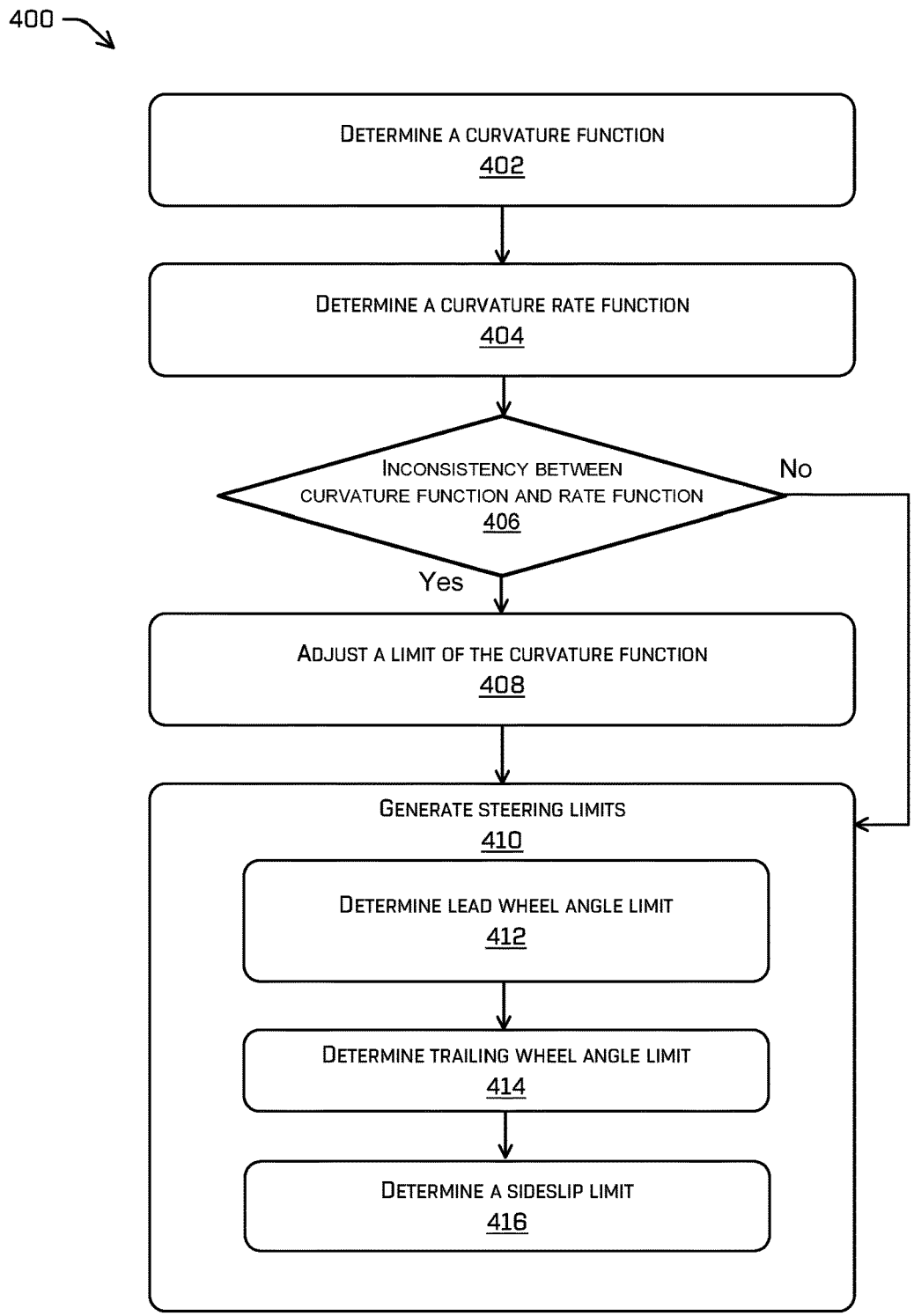
FIG. 4 is a block diagram of an example process for generating steering limits for a vehicle, according to at least some examples.

FIG. 4 represents a process 400 for generating steering limits for a vehicle having four-wheel steering. In some examples, the process 400 can be implemented using components and systems illustrated in FIG. 1 and/or FIG. 2 and described above, such as the planning component 118 and the steering limit component 122, although the process 400 is not limited to being performed by such components and may be performed, in whole or in part, by a separate system, such as a computing system prior to operation of the vehicle 102. Moreover, the components and systems of FIGS. 1 and 2 are not limited to performing the process 400.

At operation 402, the process 400 includes determining a curvature function for the vehicle 102. The curvature function defines a maximum curvature at different speeds for a vehicle based on operational domains. Different curvature functions may be generated or defined for different operational domains. For example, a first curvature function may be used to define a curvature in sunny driving conditions while a second curvature function may define a curvature in rainy driving conditions. Due to the changes in road conditions, the second curvature function may limit the curvature of the vehicle due to an increased likelihood of tires slipping while turning at a maximum curvature. The curvature function defines a path curvature of the vehicle 102 as a function of a speed for the autonomous vehicle. As such, the process 400 may be repeated for different operational domains to generate different steering limits for each operational domain that may be used agnostic to vehicle type in each of those domains. The curvature function may initially be determined by setting the path curvature to a maximum value. As described above, the operation 402 may be performed by the preprocessing component 310, which may saturate the curvature function (function defining allowable curvature as a function of speed) and setting the curvature function to a maximum value given the specific angle limits from the defined limits.

At operation 404, the process 400 includes determining a curvature rate function based on the rate of change of the curvature of the vehicle 102. The curvature rate function may be based on the operational domain, as described above with respect to the curvature function. Accordingly, different curvature rate functions may be generated for different operational domains. The curvature rate function defines allowable bounds for the curvature rate as a function of the speed of the vehicle 102. As described above with respect to operation 402, the curvature rate function defines the allowable curvature rate change based on various inputs including defined standards, such as thresholds and standards set by system design for the vehicle 102.

At operation 406, the process 400 includes determining whether an inconsistency exists between the curvature function and the curvature rate function. For example, it may be impossible to satisfy each of the curvature and curvature rate functions during acceleration or deceleration of the vehicle, in this manner, the possible or reachable curvature may not be a possible curvature that is within the limits set by the function. When such an inconsistency is identified, the process 400 may proceed to operation 408. When no inconsistency is identified, the process 408 may proceed to operation 410.

At operation 408, the process 400 includes adjusting a limit of the curvature function. As described with respect to the preprocessing component 310, any inconsistency between the curvature function and the curvature rate function are resolved by adjusting a limit or intercept of the curvature function. For example, it may be impossible to satisfy each of the curvature and curvature rate functions during acceleration or deceleration of the vehicle, in this manner, the possible or reachable curvature may not be a possible curvature that is within the limits set by the function. To resolve these inconsistencies, the limits of the curvature function are reduced such that the inconsistency is resolved and the curvature rate function enables changes in the curvature function without exceeding the bounds defined by each function. The limits define the maximum curvature value, and by reducing the limit, the maximum curvature that may be reached by the vehicle 102 is reduced to a range that is possible given the limitations of the curvature rate function.

At operation 410, the process 400 includes generating steering limits. The steering limits may be stored as a lookup table as described herein. In an embodiment, the steering limits may be stored in one or more databases and/or as one or more mathematical functions, The limit lookup table may be generated before the vehicle 102 is in operation and may therefore be performed either on-board the vehicle 102 or by a remote computing system. As described herein, the curvature function, curvature rate function, and other functions describing the limits for the vehicle 102 may be agnostic to vehicle type, meaning each vehicle type may have separate lookup tables. In addition, the separate vehicles may also each include multiple tables for different operating conditions as described above.

Operations 412, 414, and 416 may each be performed as part of operation 408, and include sub-processes that are included in generating the lookup table. At operation 412, the process 400 includes determining a leading angle limit for a leading steering angle based at least in part on the curvature function. The defined curvature function, after being adjusted for the inconsistencies as noted with respect to operation 408, may be used with vehicle specific parameters to convert the curvature function to specific steering angles for the leading wheels of the vehicle. Operation 414 includes specific angle limits for the trailing wheel angle limits and is generated or determined in the same manner, based on the curvature function. The lead wheel angle limit and trailing angle wheel limit are accompanied by lead wheel angle rate limits and trailing wheel angle rate limits defining a limit on the rate of change of the wheel angle for each as a function of speed, as defined by the curvature rate function.

At operation 416, the process 400 includes defining a sideslip limit for the steering angles. The sideslip limit is defined as a sum of the steering angle of the leading wheels and the trailing wheels, which is set to below a threshold. The sum of the steering angle being below a threshold limits sideslip for the vehicle. In addition, the sideslip limitation enforces saturating the trailing wheels before saturating the leading wheels, to further reduce the sideslip experienced by the vehicle 102.

In some examples, the operation 410 also includes an operation to bound the curvature and the curvature rate by setting a limit on a difference between the trailing wheel angle and the leading wheel angle, in addition to establishing a threshold for a difference between the rate of change for each.

As each limit is added to the lookup table, the lookup table is generated having entries for angle limits and rate of change limits for the steering angles of the wheels based on a dynamically changing speed of the vehicle. Because the original curvature function and curvature rate function were determined based on the speed of the vehicle and not on any vehicle-specific parameters, the same functions may be used to generate the lookup tables for different vehicle types and different operating environments and conditions.

The vehicle 102 may be steered and controlled using the limit lookup table generated at operation 410. The operation of the vehicle 102 may be controlled to maintain operating parameters, such as the steering angle and steering angle rate, within the limits defined by the limit lookup table given the speed of the vehicle 102. The limits may be used by the planning component 118 to determine a trajectory for the vehicle 102 to follow.

Figure 5:
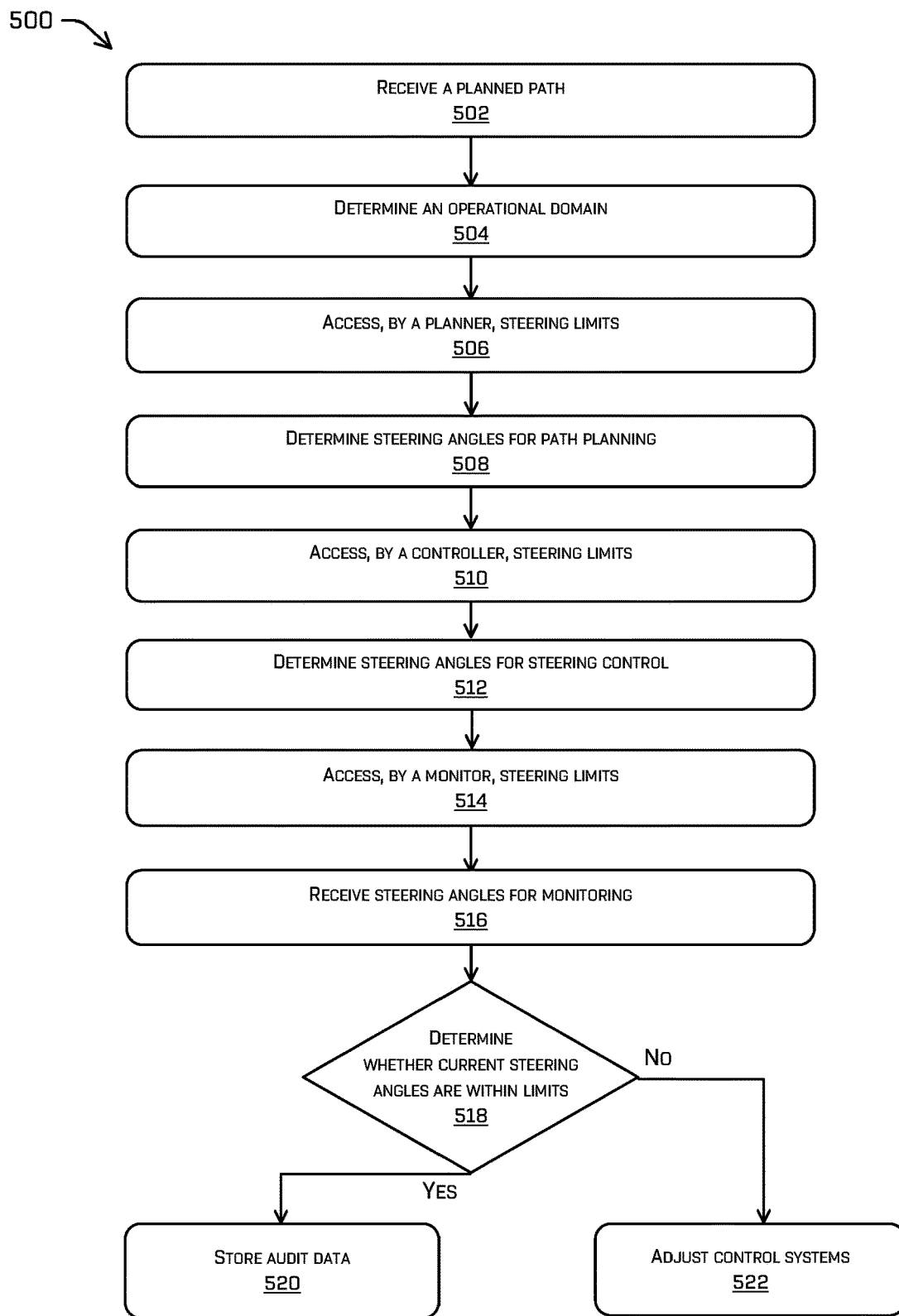
FIG. 5 is a block diagram of an example process for implementing steering limits on a vehicle, according to at least some examples.

FIG. 5 is a block diagram of an example process 500 for implementing steering limits on a vehicle, according to at least some examples. In some examples, the process 500 can be implemented using components and systems illustrated in FIG. 1 and/or FIG. 2 and described above, such as the planning component 118 and the steering limit component 122, although the process 500 is not limited to being performed by such components and may be performed, in whole or in part, by a separate system of the vehicle 102. Moreover, the components and systems of FIGS. 1 and 2 are not limited to performing the process 500. The process 500 may be performed during operation of the vehicle 102 and may be used to implement steering limits generated using process 400.

At operation 502, the process 500 includes receiving a planned path for the vehicle 102. The planned path may be generated by the planning component. The planned path may include one or more turns and changes in velocity and acceleration for the vehicle 102. The planned path may be generated by the components of the vehicle 102 based on a destination, sensor data, and surrounding environment, including obstacles in the environment.

At operation 504, the process 500 includes determining an operational domain based on the environment and the conditions the vehicle 102 is operating within. The operational domain may be determined based on environmental sensors, location sensors, and other such data describing an operating location and operating conditions surrounding the vehicle 102.

At operation 506, the process 500 includes accessing steering limits, by a planner of the vehicle, for the front and rear wheels of the vehicle 102. The steering limits may be accessed from a database, lookup table, and/or mathematical functions. The steering limits may be defined before operating the vehicle 102 as described above with respect to process 400. The planner may be the planning component 222 of FIG. 2. The planner may be implemented on a first computing device of the vehicle. The steering limits may be accessed based on the speed of the vehicle, acceleration of the vehicle, and other operating parameters of the vehicle. The speed of the vehicle may be input into a lookup table, database, or mathematical function to determine steering limits for the front and rear wheels of the vehicle 102. As part of accessing the steering limits, the planner may access different limits based on intended use or identity of the system, for example to access steering limits with particular buffers or multipliers applied previously. In some examples, the steering limits may be accessed and subsequently processed by the planner to apply a buffer or multiplier as described with respect to FIG. 2 above.

At operation 508, the process 500 includes determining steering angles for the front wheels and the rear wheels of the vehicle 102 during path generation using the steering limits from 506. The steering angles may be generated based on the planned path for the vehicle with the steering limits accessed at 506 used to define bounds for path generation.

In some examples, the planner may use a first model, such as a kinematic model of the vehicle for path generation and implement the steering limits with the kinematic model to generate a path for the vehicle including trajectories and steering angles for the wheels, either for two of all four wheels of the vehicle. The steering angles may be generated by a planning component and/or an operational component of a control system for the vehicle 102. The vehicle 102 may then be operated, steered, and controlled to follow the planned path without exceeding the steering limits accessed at operation 506. In some examples, the process 500 may include using the steering limits to plan a path for the vehicle to follow to reach a destination based on a first vehicle model.

At operation 510, the process 500 includes accessing, by a controller, the steering limits. The controller may be an example of the controller 228 of FIG. 2 and may be implemented on a second computing device separate from the computing device operating the planner. The controller may access previously adjusted steering limits or may apply a multiplier or buffer to accessed steering limits as described above. In some examples, the steering limits may be accessed from the same location accessed by the planner. In some examples, the steering limits may be stored redundantly with the separate computing devices and accessed at the redundant locations.

At operation 512, the process 500 includes determining steering angles for steering control based on the steering limits accessed at 510. The steering angles may be generated based on a second model of the vehicle, such as a dynamic model and also based on the path from the planner, that implemented the first model (e.g., a low fidelity model). The controller may also convey the determined steering angles to steering controllers for the wheels of the vehicle. In some examples the steering limits may be conveyed to two or four of the wheels, depending on whether the vehicle is equipped for two or four wheel steering.

At operation 514, the process 500 includes accessing, by a monitor, the steering limits. The monitor may be an example of the monitor 232 of FIG. 2 and may be implemented on a third computing device separate from the computing device operating the planner or the computing device operating the controller. The monitor may access previously adjusted steering limits or may apply a multiplier or buffer to accessed steering limits as described above. In some examples, the steering limits may be accessed from the same location accessed by the planner or the controller. In some examples, the steering limits may be stored redundantly with the separate computing devices and accessed at the redundant locations.

At operation 516, the process 500 includes receiving steering angles for monitoring operation of the steering system based on the steering limits accessed at 514. The monitor may receive the steering angles as feedback signals from the steering components of the wheels, the signals indicating the current or recent steering angles of each wheel. The monitor may access the steering limits as described above and identify steering limits for the vehicle based on the operating conditions, including the operating domain and the speed of the vehicle, among other operating conditions. The steering limits identified may then be compared against the feedback signals to ensure compliance of the steering system with the steering limits. In some examples, the monitor may generate a signal in response to the steering angle signal exceeding the steering limits, either adjusted or unadjusted, indicating that the steering system may have a fault that should be addressed. The steering angles and the associated limits may be stored in a memory of the vehicle system or of a remote system as an audit log that may be used to analyze performance of the steering system and compliance with the steering limits.

At on 518, the process 500 includes determining whether current steering angles are within current limits. The determination may be made by the monitor and may be a result of a comparison of current steering angle limits as accessed or determined as described above with the current steering angles of the wheels. The determination at 518 identifies whether the vehicle is operating within the steering limits as defined, or if some error or inconsistency is causing the vehicle to operate outside of normal operating bounds.

At operation 520, the process 500 includes storing audit data in response to determining that the current steering angles fall within the steering limits. The audit data may be stored as part of an audit log that may be used to verify performance and consistency of the vehicle and a fleet of vehicles. The audit log may also be used to identify deviations from the steering limits as described below. The control of the autonomous vehicle may remain unadjusted or may continue as previously determined in response to determining that the steering angles are within the steering angle limits.

At operation 522, the process 500 includes adjusting control systems of the vehicle in response to determining that the current steering angles are outside of the steering limits. The operation may be adjusted to further reduce the steering limits, adjust one or more parameters of the planner or controller, or other system parameters that may cause the vehicle to operate outside of the steering limits. In some examples, in response to the determination, the process 500 may include generating an alert or notification that the vehicle is operating outside of steering limits, which may indicate a need for vehicle service or adjustment. In some examples a maintenance request or other notification may be requested to identify the deviation outside the steering limits and notify one or more maintenance or management systems of the vehicle.

Figure 6:
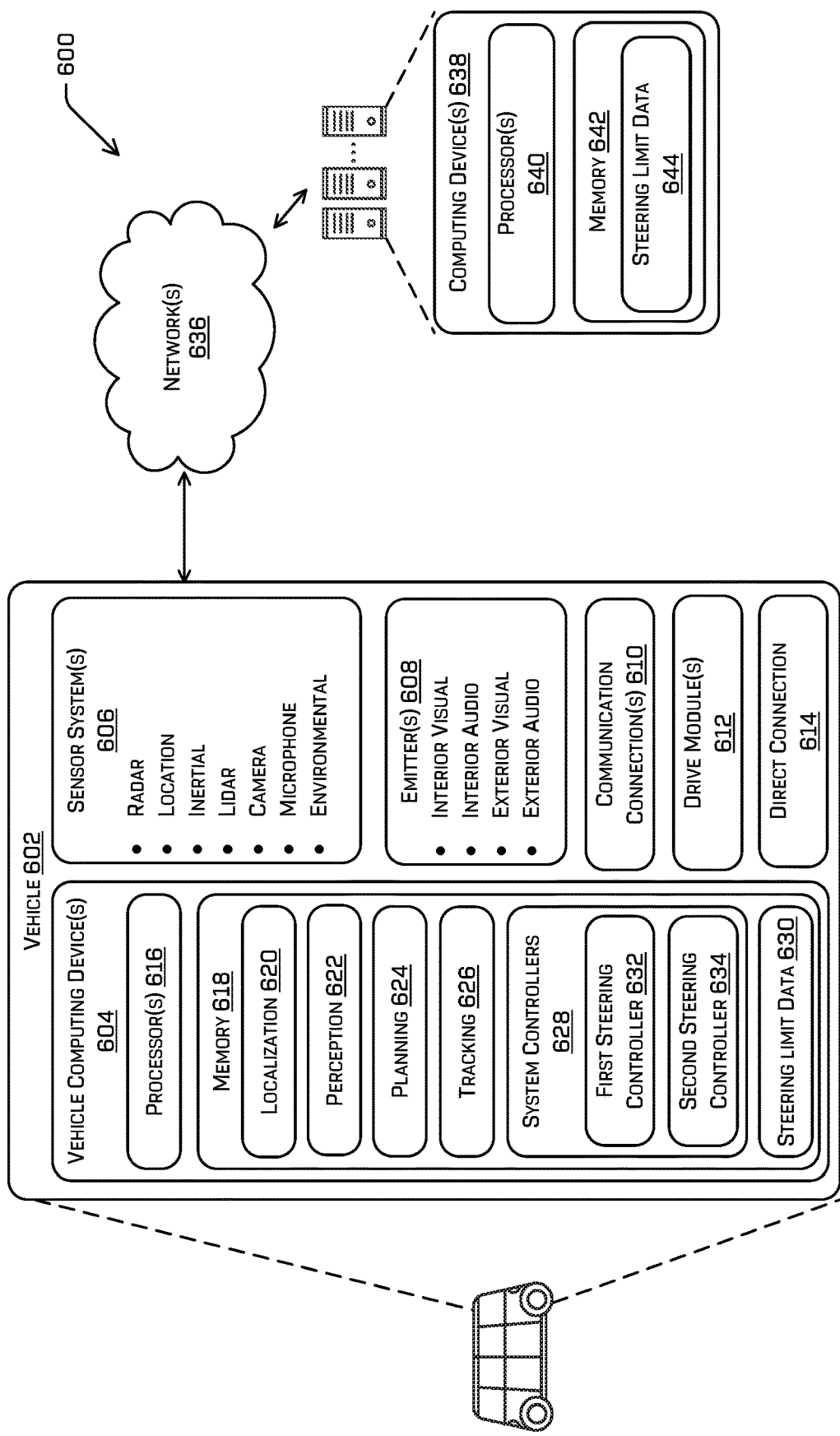
FIG. 6 is a flow diagram of an example process for controlling a vehicle using four-wheel steering, according to at least some examples.

FIG. 6 depicts a block diagram of a system 600 for implementing the techniques described herein. In at least one example, the system 600 can include a vehicle 602, which may be the same as or different from the vehicle 102 shown in FIG. 1 or the vehicle 200 of FIG. 2. The vehicle 602 can include one or more vehicle computing device(s) 604, one or more sensor system(s) 606, one or more emitter(s) 608, one or more communication connection(s) 610, one or more drive module(s) 612, and at least one direct connection 614.

The vehicle computing device(s) 604 also include one or more processor(s) 616 and memory 618 communicatively coupled to the one or more processor(s) 616. In the illustrated example, the vehicle 602 is an autonomous vehicle. However, the vehicle 602 could be any other type of vehicle, or any other system having at least one sensor (e.g., a camera enabled smartphone). In the illustrated example, the memory 618 of the vehicle computing device(s) 604 stores a localization component 620, a perception component 622, a planning component 624, a tracking component 626, system controllers 628, and steering data 630. Moreover, the system controllers 628 include first steering controller 632 and a second steering controller 634. Though depicted in FIG. 6 as residing in the memory 618 for illustrative purposes, it is contemplated that the localization component 620, the perception component 622 (and/or components thereof), the planning component 624, the tracking component 626, the system controllers 628, and the steering data 630 can additionally, or alternatively, be accessible to the vehicle 602 (e.g., stored on, or otherwise accessible by, memory remote from the vehicle 602).

In at least one example, the localization component 620 can include functionality to receive data from the sensor system(s) 606 to determine a position and/or orientation of the vehicle 602 (e.g., one or more of an x-, y-, z-position, roll, pitch, or yaw). For example, the localization component 620 can include and/or request/receive a map of an environment and can continuously determine a location and/or orientation of the autonomous vehicle within the map. In some instances, the localization component 620 can utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the autonomous vehicle. In some instances, the localization component 620 can provide data to various components of the vehicle 602, such as the planning component 624, to determine a current position of the vehicle 602 for generating a trajectory.

In some instances, the perception component 622 generally includes functionality to perform object detection, segmentation, and/or classification. In some examples, the perception component 622 can provide processed sensor data that indicates a presence of an object that is proximate to the vehicle 602 and/or a classification of the object as an object type (e.g., car, pedestrian, cyclist, animal, building, tree, road surface, curb, sidewalk, unknown, etc.). In additional and/or alternative examples, the perception component 622 can provide processed sensor data that indicates one or more characteristics associated with a detected object (e.g., a tracked object) and/or the environment in which the object is positioned. In some examples, characteristics associated with the object can include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Characteristics associated with the environment can include, but are not limited to, a presence of another object in the environment, a state of another object in the environment, a time of day, a day of a week, a season, a weather condition, an indication of darkness/light, etc.

In general, the planning component 624 can determine a path for the vehicle 602 to follow to traverse through an environment. The planning component 624 can be, or include functionality ascribed to, the planning component 118 and/or the planning component 222. For example, the planning component 624 can determine various routes and trajectories and various levels of detail using a vehicle model. The planning component 624 may plan the trajectories using the limits described herein to ensure trajectories fall within the limits or bounds set by the steering limit component 224. The planning component 624 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 624 can generate an instruction for guiding the autonomous vehicle along at least a portion of the route from the first location to the second location. In at least one example, the planning component 624 can determine how to guide the autonomous vehicle from a first waypoint in the sequence of waypoints to a second waypoint in the sequence of waypoints. In some examples, the instruction can be a trajectory, or a portion of a trajectory. The trajectory can include a series of vehicle states corresponding to the waypoints and commands for achieving those states. Such commands can include steering angles and accelerations, for example. Without limitation, the planning component 624 may receive a current steering angle, e.g., of leading wheels of a vehicle, and determine trajectories based at least in part on the steering angle and steering angle limits described herein. The model may be a kinematic model of the vehicle, in which the vehicle 602 is assumed to have a point of zero velocity midway between a leading axis and a trailing axis, as described herein. In some implementations, multiple trajectories can be substantially simultaneously generated (e.g., within technical tolerances) in accordance with a receding horizon technique, with one of the multiple trajectories being selected for the vehicle 602 to navigate.

The tracking component 626 includes functionality to adjust steering commands to follow a planned path, e.g., in accordance with a trajectory generated by the planning component 624. In examples, the tracking component 626 can use a vehicle model, such as a dynamic vehicle model, to generate leading wheel steering angles and trailing wheel steering angles for controlling the vehicle 602 to follow a path and may ensure that the steering angles remain within the dynamic limits established by the steering limit component 224.

The system controllers 628 can be configured to control steering, propulsion, braking, safety, emitters, communication, and other systems of the vehicle 602, e.g., based on controls generated by the planning component 624 and/or the tracking component 626. The operation of each of these different systems may be limited by the steering limits (which may include limits for other parameters such as acceleration, deceleration, or other operations that include the use of other equipment of the vehicle 102). Although described with respect to steering herein, the description herein may be used to define velocity, acceleration, jolt, and other limits for the vehicle 102, including limits for operation in different driving modes (such as drive or reverse gears). As illustrated, the system controllers 628 include a first steering controller 632 and a second steering controller 634. For instance, the first steering controller 632 can be used to control a steering angle of leading wheels of the vehicle 602. The second steering controller 634 can be used to control a steering angle of the trailing wheels of the vehicle, e.g., independently of the leading wheels. The system controllers 628 can communicate with and/or control corresponding systems of the drive module(s) 612 and/or other components of the vehicle 602.

The steering data 630 can be used by the vehicle 602 in association with four-wheel steering techniques, as described herein. For instance, the steering data 630 can include information about steering constraints, such as maximum steering angles and/or maximum steering rate limits, for the leading wheels and the trailing wheels. Also, in implementations, the steering data 630 can include a steering command library accessible by various components of the vehicle 602 to provide steering information in different formats, adapted for those components. Without limitation, the steering data 630 can include data to select a steering angle and/or rate limits and to convert curvature and curvature rate information to front and rear steering limits in radians and radians/second, respectively, for different components. For instance, the steering data 630 can include conversion factors to facilitate such conversions. Moreover, in some instances, the steering data 630 can include information to allow for both two-wheel and four-wheel steering, e.g., for translation or conversion of information when switching from two-wheel to four-wheel steering, or vice versa. The steering data 630 may be a steering library accessible by the various components of the vehicle 602, including the localization component 620, the perception component 622, the planning component 624, the tracking component 626, and/or other components.

As can be understood, the components discussed herein (e.g., the localization component 620, the perception component 622 (and its components), the planning component 624, the tracking component 626, the system controllers 628, and the steering data 630) are shown and described as divided for illustrative purposes. However, the operations performed by the various components can be combined or performed in any other component.

The sensor system(s) 606 can include LiDAR sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 606 can include multiple instances of each of these or other types of sensors. For instance, the lidar sensors can include individual lidar sensors located at the corners, front, back, sides, and/or top of the vehicle 602. As another example, the camera sensors can include multiple cameras disposed at various locations about the exterior and/or interior of the vehicle 602. As another example, the radar system can include multiple instances of the same or different radar sensors disposed at various locations about the vehicle 602. The sensor system(s) 606 can provide input to the vehicle computing device(s) 604. Additionally, or alternatively, the sensor system(s) 606 can send sensor data, via one or more network(s) 636, to computing device(s) 638 at a particular frequency, after a lapse of a predetermined period of time, in near real-time, etc.

The emitter(s) 608 can be configured to emit light and/or sound. The emitter(s) 608 in this example can include interior audio and visual emitters to communicate with passengers of the vehicle 602. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 608 in this example can also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The communication connection(s) 610 can enable communication between the vehicle 602 and one or more other local or remote computing device(s). For instance, the communication connection(s) 610 can facilitate communication with other local computing device(s) on the vehicle 602 and/or the drive module(s) 612. Also, the communication connection(s) 610 can allow the vehicle to communicate with other nearby computing device(s) (e.g., other nearby vehicles, traffic signals, etc.). The communications connection(s) 610 also enable the vehicle 602 to communicate with a remote teleoperations computing device or other remote services.

The communication connection(s) 610 can include physical and/or logical interfaces for connecting the vehicle computing device(s) 604 to another computing device or a network, such as the network(s) 636. For example, the communication connection(s) 610 can enable Wi-Fi-based communication such as via frequencies defined by the IEEE 802.11 standards, short range wireless frequencies such as Bluetooth®, cellular communication (e.g., 2G, 3G, 6G, 6G LTE, 5G, etc.) or any suitable wired or wireless communications protocol that enables the respective computing device to interface with the other computing device(s).

In at least one example, the vehicle 602 can include the drive module(s) 612. In some examples, the vehicle 602 can have a single drive module 612. In at least one example, the vehicle 602 may have multiple drive modules 612 with individual of the drive module(s) 612 positioned on opposite ends of the vehicle 602 (e.g., the front and the rear, etc.). In at least one example, the drive module(s) 612 can include one or more sensor systems to detect conditions of the drive module(s) 612 and/or the surroundings of the vehicle 602. By way of example and not limitation, the sensor system(s) associated with the drive module(s) 612 can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders can be unique to the drive module(s) 612. In some cases, the sensor system(s) on the drive module(s) 612 can overlap or supplement corresponding systems of the vehicle 602 (e.g., the sensor system(s) 606).

The drive module(s) 612 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 612 can include a drive module controller which can receive and preprocess data from the sensor system(s) and to control operation of the various vehicle systems. In some examples, the drive module controller can include one or more processors and memory communicatively coupled with the one or more processors. The memory can store one or more modules to perform various functionalities of the drive module(s) 612. Furthermore, the drive module(s) 612 may also include one or more communication connection(s) that enable communication by the respective drive module with one or more other local or remote computing device(s).

In at least one example, the direct connection 614 can provide a physical interface to couple the drive module(s) 612 with the body of the vehicle 602. For example, the direction connection 614 can allow the transfer of energy, fluids, air, data, etc. between the drive module(s) 612 and the vehicle. In some instances, the direct connection 614 can further releasably secure the drive module(s) 612 to the body of the vehicle 602.

As also illustrated, the vehicle 602 may be in communication, via the network(s) 636 with the computing device(s) 638. For instance, the computing device(s) 638 may implement functionality described herein. In more detail, the computing device(s) 638 can include processor(s) 640 and memory 642 storing steering data 644.

The steering data 644 may include the steering data 630. For instance, the steering data 630 may be a subset of the steering data 644, which may be loaded to the vehicle 602 prior to operation of the vehicle. Without limitation, the steering data 644 may include a centralized database of steering data, such as the curvature function and/or curvature rate function, in addition to additional limit functions, for a fleet of vehicles, including the vehicle 602, and the steering data 630 may be uploaded to the vehicle 602 as needed.

The processor(s) 616 of the vehicle 602 and the processor(s) 640 of the computing device(s) 638 can be any suitable processor capable of executing instructions to process data and perform operations as described herein. By way of example and not limitation, the processor(s) 616 and 640 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 618 and the memory 642 are examples of non-transitory computer-readable media. The memory 618 and the memory 642 can store an operating system and one or more software applications, instructions, programs, and/or data to implement the methods described herein and the functions attributed to the various systems. In various implementations, the memory can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

Although FIG. 6 is illustrated as a distributed system, in alternative examples, components of the vehicle 602 can be associated with the computing device(s) 638 and/or components of the computing device(s) 638 can be associated with the vehicle 602. That is, the vehicle 602 can perform one or more of the functions associated with the computing device(s) 638, and vice versa. Further, aspects of the perception component 622 and/or the tracking component 626 can be performed on any of the devices discussed herein.

EXAMPLE CLAUSES

Any of the example clauses in this section may be used with any other of the example clauses and/or any of the other examples or embodiments described herein.

A. An autonomous vehicle, comprising: one or more processors; and memory storing instructions that, when executed by the one or more processors, cause the autonomous vehicle to perform actions comprising: determining, prior to operating the autonomous vehicle, a first curvature function defining a path curvature of the autonomous vehicle as a function of a speed for the autonomous vehicle by setting the path curvature to a maximum value based on an operational domain; determining, prior to operating the autonomous vehicle, a curvature rate function defining an allowable change in curvature as a function of speed for the autonomous vehicle by setting a first curvature rate to a maximum allowable rate based on the operational domain; reducing a limit of the first curvature function in response to determining that a slope of the first curvature function at a first speed exceeds a value of the curvature rate function at the first speed to produce a second curvature function; generating steering limit data for the autonomous vehicle by at least: determining a leading angle limit for a leading steering angle based at least in part on the second curvature function; determining a trailing angle limit for a trailing steering angle based at least in part on a difference between the leading angle limit and the trailing angle limit being less than a first threshold; and transmitting, for use during operation of the autonomous vehicle, the steering limit data.

B. The autonomous vehicle of paragraph A, the actions for generating the steering limit data further comprising: determining a leading angle rate limit for a change in the leading steering angle based at least in part on the curvature rate function; and determining a trailing angle rate limit for a change in the trailing steering angle based at least in part on the curvature rate function.

C. The autonomous vehicle of paragraph A or B, wherein the steering limit data is first steering limit data for a first operational domain describing a first set of driving conditions for the autonomous vehicle, the actions further comprising generating second steering limit data for a second operational domain based on a third curvature function and a second curvature rate function defining a second path curvature and a second curvature rate during a second set of driving conditions, the second curvature function different from the third curvature function and the second curvature rate different from the first curvature rate based at least in part on the second set of driving conditions.

D. The autonomous vehicle of any of paragraphs A-C, wherein generating the steering limit data further comprises: determining a sideslip limit based at least in part on a sum of the leading steering angle and the trailing steering angle being less than a second threshold.

E. A method, comprising: determining a first curvature function defining a path curvature of an autonomous vehicle as a function of a speed for the autonomous vehicle; determining a first curvature rate function defining a first curvature rate as a change in curvature as a function of speed for the autonomous vehicle; generating steering limit data for the autonomous vehicle by at least: determining a leading angle limit for a leading steering angle based at least in part on the first curvature function; determining a trailing angle limit for a trailing steering angle based at least in part on a difference between the leading angle limit and the trailing angle limit being less than a first threshold; and transmitting the steering limit data to the autonomous vehicle for control of at least one of leading wheels or trailing wheels of the autonomous vehicle.

F. The method of paragraph E, further comprising reducing a limit of the first curvature function in response to determining that a slope of the first curvature function at a first speed exceeds a value of the first curvature rate function at the first speed to produce a second curvature function, wherein the leading angle limit is based at least in part on the second curvature function.

G. The method of paragraphs E or F, further comprising receiving driving condition data describing an environment around the autonomous vehicle, and wherein determining the first curvature function and the first curvature rate function are further based on the driving condition data.

H. The method of any of paragraphs E-G, wherein determining the leading angle limit is further based on a vehicle type of the autonomous vehicle.

I. The method of any of paragraphs E-H, wherein determining the leading angle limit comprises converting an output of the first curvature function to an angle based on the vehicle type of the autonomous vehicle.

J. The method of any of paragraphs E-I, wherein the steering limit data is first steering limit data for a first operational domain describing a first set of driving conditions for the autonomous vehicle, the method further comprising generating second steering limit data for the autonomous vehicle based on a second curvature function and a second curvature rate function defining a second path curvature and a second curvature rate during a second set of driving conditions, the second curvature function different from the first curvature function and the second curvature rate different from the first curvature rate based at least in part on the second set of driving conditions.

K. The method of any of paragraphs E-J, wherein generating the steering limit data further comprises: determining a sideslip limit based at least in part on a sum of the leading steering angle and the trailing steering angle being less than a second threshold.

L. The method of any of paragraphs E-K, wherein the steering limit data includes limits for velocity, acceleration, and jolt of the autonomous vehicle.

M. The method of any of paragraphs E-L, wherein generating the steering limit data includes determining limits for changes in velocity, acceleration, and jolt of the autonomous vehicle based on the speed of the autonomous vehicle.

N. The method of any of paragraphs E-M, wherein transmitting the steering limit data comprises transmitting the steering limit data to a planner unit for generating a planned path based at least in part on the steering limit data.

O. The method of any of paragraphs E-N, wherein generating the steering limit data comprises: generating first steering limit data by applying a first multiplier to the steering limit data, the first steering limit data for use by a planner unit of the autonomous vehicle; and generating second steering limit data by applying a second multiplier to the steering limit data, the second steering limit data for use by a controller unit of the autonomous vehicle, the first multiplier different from the second multiplier.

P. A non-transitory computer-readable media storing instructions that, when executed by one or more processors, cause the one or more processors to perform actions comprising: determining a first curvature function defining a path curvature of an autonomous vehicle as a function of a speed for the autonomous vehicle; determining a first curvature rate function defining a first curvature rate as a change in curvature as a function of speed for the autonomous vehicle; generating steering limit data for the autonomous vehicle by at least: determining a leading angle limit for a leading steering angle based at least in part on the first curvature function; determining a trailing angle limit for a trailing steering angle based at least in part on a difference between the leading angle limit and the trailing angle limit being less than a first threshold; and transmitting the steering limit data to the autonomous vehicle for control of at least one of leading wheels or trailing wheels of the autonomous vehicle.

Q. The non-transitory computer-readable media of paragraph P, the actions for generating the steering limit data further comprising: determining a leading angle rate limit for a change in the leading steering angle based at least in part on the first curvature rate function; and determining a trailing angle rate limit for a change in the trailing steering angle based at least in part on the first curvature rate function.

R. The non-transitory computer-readable media of paragraphs P or Q, wherein generating the steering limit data further comprises: determining a sideslip limit based at least in part on a sum of the leading steering angle and the trailing steering angle being less than a second threshold.

S. The non-transitory computer-readable media of any of paragraphs P-R, wherein the steering limit data is first steering limit data for a first operational domain of the autonomous vehicle, the actions further comprising generating second steering limit data for the autonomous vehicle based on a second curvature function and a second curvature rate function defining a second path curvature and a second curvature rate for a second operational domain, the second curvature function different from the first curvature function and the second curvature rate different from the first curvature rate based at least in part on the second operational domain.

T. The non-transitory computer-readable media of any of paragraphs P-S, further comprising reducing a limit of the first curvature function in response to determining that a slope of the first curvature function at a first speed exceeds a value of the first curvature rate function at the first speed to produce a second curvature function, wherein the leading angle limit U. A method for operating an autonomous vehicle, comprising: accessing steering limit data generated prior to operation of the autonomous vehicle, the steering limit data defining dynamic steering angle limits for wheels of the autonomous vehicle based on vehicle-agnostic operating parameters; determining, by a planner of the autonomous vehicle using the steering limit data with a first model of the autonomous vehicle, a planned path for the autonomous vehicle; determining, by a controller of the autonomous vehicle using the steering limit data with a second model of the autonomous vehicle, steering angles for the wheels of the autonomous vehicle to follow the planned path; transmitting the steering angles to a steering control system to control operation of the autonomous vehicle; determining, by a monitor of the autonomous vehicle and using the steering limit data with a third model of the autonomous vehicle, audit data describing current limits for the steering angles of the wheels; receiving, at the monitor of the autonomous vehicle and from the steering control system, steering angle data related to current steering angles of the wheels; determining, by the monitor, whether the current steering angles are within the current limits; and controlling the autonomous vehicle based at least in part on whether the current steering angles are within the current limits.

V. The method of paragraph U, wherein the first model is a kinematic model of the autonomous vehicle, the second model is a first dynamic model of the autonomous vehicle, and the third model is a second dynamic model of the autonomous vehicle.

W. The method of paragraph U or V, wherein accessing the steering limit data comprises: accessing, by the planner, a first subset of the steering limit data for use by the planner; accessing, by the controller, a second subset of the steering limit data for use by the controller; and accessing, by the monitor, a third subset of the steering limit data for use by the monitor.

X. The method of any of paragraphs U-W, further comprising: determining planner steering limit data for use by the planner by multiplying the steering limit data by a multiplier having a value less than one; determining controller steering limit data for use by the controller by adding a first buffer amount to the steering limit data; and determining monitor steering limit data for use by the monitor by adding a second buffer amount to the steering limit data.

Y. A method comprising: determining, by a first component of a vehicle, a first steering angle limit based at least in part on a first model and steering limit data; and determining, by a second component of the vehicle, a second steering angle limit for the vehicle based at least in part on: (1) a second model different from the first model; and (2) the steering limit data, wherein the steering limit data is stored as a common data structure for use by the first component and the second component.

Z. The method of paragraph Y, further comprising: determining, based at least in part on the first steering angle limit, a path for the vehicle; and determining, based at least in part on the second steering angle limit, a steering angle for the vehicle.

AA. The method of paragraph Y or Z, further comprising: determining, by a sensor of the vehicle, sensor data associated with an environment of the vehicle, wherein: the path and the steering angle for the vehicle are based at least in part on the sensor data.

AB. The method of any of paragraphs Y-AA, further comprising: auditing, by a third component of the vehicle and using a third model different from the first and second models, steering angle commands from the first component and the second component based at least in part on the steering limit data.

AC. The method of any of paragraphs Y-AB, wherein the auditing includes preventing a commanded steering angle of the vehicle from being commanded by the first component or the second component.

AD. The method of any of paragraphs Y-AC, wherein determining the first steering angle limit comprises: accessing a first subset of the steering limit data for use by first component; and accessing a second subset of the steering limit data for use by the second component.

AE. The method of any of paragraphs Y-AD, wherein determining the first steering angle limit comprises: multiplying the steering limit data by a multiplier having a value less than one; and determining the second steering angle limit comprises adding a buffer amount to the steering limit data.

AF. The method of any of paragraphs Y-AE, wherein the steering limit data comprises two-wheel steering limit data for use with two-wheel steering autonomous vehicles and excludes steering angles for trailing wheels of the autonomous vehicle.

AG. The method of any of paragraphs Y-AF, wherein the steering limit data comprises four-wheel steering limit data for use with four-wheel steering autonomous vehicles.

AH. The method of any of paragraphs Y-AG, wherein first model has a first level of fidelity and the second model has a second level of fidelity higher than the first level of fidelity.

AI. The method of any of paragraphs, Y-AH, wherein the first model comprises a kinematic model and the second model comprises a dynamic model.

AJ. A non-transitory computer-readable media storing instructions that, when executed by one or more processors, cause the one or more processors to perform actions comprising: determining, by a first component of a vehicle, a first steering angle limit based at least in part on a first model and steering limit data; and determining, by a second component of the vehicle, a second steering angle limit for the vehicle based at least in part on: (1) a second model different from the first model; and (2) the steering limit data, wherein the steering limit data is stored as a common data structure for use by the first component and the second component.

AK. The non-transitory computer-readable media of paragraph AJ, the actions further comprising: determining, based at least in part on the first steering angle limit, a path for the vehicle; and determining, based at least in part on the second steering angle limit, a steering angle for the vehicle.

AL. The non-transitory computer-readable media of paragraphs AJ or AK, the actions further comprising: determining, by a sensor of the vehicle, sensor data associated with an environment of the vehicle, wherein: the path and the steering angle for the vehicle are based at least in part on the sensor data.

AM. The non-transitory computer-readable media of any of paragraphs AJ-AL, the actions further comprising: auditing, by a third component of the vehicle and using a third model different from the first and second models, steering angle commands from the first component and the second component based at least in part on the steering limit data.

AN. The non-transitory computer-readable media of any of paragraphs AJ-AM, wherein the auditing includes preventing a commanded steering angle of the vehicle from being commanded by the first component or the second component.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The modules described herein represent instructions that can be stored in any type of computer-readable medium and can be implemented in software and/or hardware. All of the methods and processes described above can be embodied in, and fully automated via, software code modules and/or computer-executable instructions executed by one or more computers or processors, hardware, or some combination thereof. Some or all of the methods can alternatively be embodied in specialized computer hardware.

Conditional language such as, among others, "can," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. can be either X, Y, or Z, or any combination thereof, including multiples of each element. Unless explicitly described as singular, "a" means singular and plural.

While one or more examples of the invention have been described, various alterations, additions, permutations and equivalents thereof are included within the scope of the invention.

In the description of embodiments, reference is made to the accompanying drawings that form a part hereof, which show by way of illustration specific embodiments of the claimed subject matter. It is to be understood that other embodiments may be used and that changes or alterations, such as structural changes, may be made. Such embodiments, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other embodiments using alternative orderings of the computations could be readily implemented. In addition to being reordered, the computations could also be decomposed into sub-computations with the same results.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions can be deleted, or executed out of order from that shown or discussed, including substantially synchronously or in reverse order, depending on the functionality involved as would be understood by those skilled in the art.

It should be emphasized that many variations and modifications can be made to the above-described examples, the elements of which are to be understood as being among other acceptable examples. All such modifications and variations are intended to be included herein within the scope of this disclosure and protected by the following claims.

What is claimed is:

1. An autonomous vehicle, comprising:
one or more processors; and
memory storing instructions that, when executed by the one or more processors, cause the autonomous vehicle to perform actions comprising:
determining, prior to operating the autonomous vehicle, a first curvature function defining a path curvature of the autonomous vehicle as a function of a speed for the autonomous vehicle by setting the path curvature to a maximum value based on an operational domain;
determining, prior to operating the autonomous vehicle, a curvature rate function defining an allowable change in curvature as a function of speed for the autonomous vehicle by setting a first curvature rate to a maximum allowable rate based on the operational domain;
reducing a limit of the first curvature function in response to determining that a slope of the first curvature function at a first speed exceeds a value of the curvature rate function at the first speed to produce a second curvature function;

generating steering limit data for the autonomous vehicle
by at least:
determining a leading angle limit for a leading steering angle based at least in part on the second curvature function;
determining a trailing angle limit for a trailing steering angle based at least in part on a difference between the leading angle limit and the trailing angle limit being less than a first threshold; and
controlling, based at least in part on the steering limit data, the autonomous vehicle.

2. The autonomous vehicle of claim 1, the actions for generating the steering limit data further comprising:
determining a leading angle rate limit for a change in the leading steering angle based at least in part on the curvature rate function; and
determining a trailing angle rate limit for a change in the trailing steering angle based at least in part on the curvature rate function.

3. The autonomous vehicle of claim 1, wherein the steering limit data is first steering limit data for a first operational domain describing a first set of driving conditions for the autonomous vehicle, the actions further comprising generating second steering limit data for a second operational domain based on a third curvature function and a second curvature rate function defining a second path curvature and a second curvature rate during a second set of driving conditions, the second curvature function different from the third curvature function and the second curvature rate different from the first curvature rate based at least in part on the second set of driving conditions.

4. The autonomous vehicle of claim 1, wherein generating the steering limit data further comprises:
determining a sideslip limit based at least in part on a sum of the leading steering angle and the trailing steering angle being less than a second threshold.

5. A method, comprising:
determining a first curvature function defining a path curvature of an autonomous vehicle as a function of a speed for the autonomous vehicle;
determining a first curvature rate function defining a first curvature rate as a change in curvature as a function of speed for the autonomous vehicle;
generating steering limit data for the autonomous vehicle by at least:
determining a leading angle limit for a leading steering angle based at least in part on the first curvature function;
determining a trailing angle limit for a trailing steering angle based at least in part on a difference between the leading angle limit and the trailing angle limit being less than a first threshold; and
controlling, based at least in part on the steering limit data, the at least one of the leading wheels or the trailing wheels of the autonomous vehicle.

6. The method of claim 5, further comprising reducing a limit of the first curvature function in response to determining that a slope of the first curvature function at a first speed exceeds a value of the first curvature rate function at the first speed to produce a second curvature function, wherein the leading angle limit is based at least in part on the second curvature function.

7. The method of claim 5, further comprising receiving driving condition data describing an environment around the autonomous vehicle, and wherein determining the first curvature function and the first curvature rate function are further based on the driving condition data.

8. The method of claim 5, wherein determining the leading angle limit is further based on a vehicle type of the autonomous vehicle.

9. The method of claim 8, wherein determining the leading angle limit comprises converting an output of the first curvature function to an angle based on the vehicle type of the autonomous vehicle.

10. The method of claim 5, wherein the steering limit data is first steering limit data for a first operational domain describing a first set of driving conditions for the autonomous vehicle, the method further comprising generating second steering limit data for the autonomous vehicle based on a second curvature function and a second curvature rate function defining a second path curvature and a second curvature rate during a second set of driving conditions, the second curvature function different from the first curvature function and the second curvature rate different from the first curvature rate based at least in part on the second set of driving conditions.

11. The method of claim 5, wherein generating the steering limit data further comprises:
determining a sideslip limit based at least in part on a sum of the leading steering angle and the trailing steering angle being less than a second threshold.

12. The method of claim 5, wherein the steering limit data includes limits for velocity, acceleration, and jolt of the autonomous vehicle.

13. The method of claim 12, wherein generating the steering limit data includes determining limits for changes in velocity, acceleration, and jolt of the autonomous vehicle based on the speed of the autonomous vehicle.

14. The method of claim 5, further comprising transmitting the steering limit data to a planner unit for generating a planned path based at least in part on the steering limit data.

15. The method of claim 5, wherein generating the steering limit data comprises:
generating first steering limit data by applying a first multiplier to the steering limit data, the first steering limit data for use by a planner unit of the autonomous vehicle; and
generating second steering limit data by applying a second multiplier to the steering limit data, the second steering limit data for use by a controller unit of the autonomous vehicle, the first multiplier different from the second multiplier.

16. A non-transitory computer-readable media storing instructions that, when executed by one or more processors, cause the one or more processors to perform actions comprising:
determining a first curvature function defining a path curvature of an autonomous vehicle as a function of a speed for the autonomous vehicle;
determining a first curvature rate function defining a first curvature rate as a change in curvature as a function of speed for the autonomous vehicle;
generating steering limit data for the autonomous vehicle by at least:
determining a leading angle limit for a leading steering angle based at least in part on the first curvature function;
determining a trailing angle limit for a trailing steering angle based at least in part on a difference between the leading angle limit and the trailing angle limit being less than a first threshold; and
controlling, based at least in part on the steering limit data, the at least one of the leading wheels or the trailing wheels of the autonomous vehicle.

17. The non-transitory computer-readable media of claim 16, the actions for generating the steering limit data further comprising:
    determining a leading angle rate limit for a change in the leading steering angle based at least in part on the first curvature rate function; and
    determining a trailing angle rate limit for a change in the trailing steering angle based at least in part on the first curvature rate function.

18. The non-transitory computer-readable media of claim 16, wherein generating the steering limit data further comprises:
    determining a sideslip limit based at least in part on a sum of the leading steering angle and the trailing steering angle being less than a second threshold.

19. The non-transitory computer-readable media of claim 16, wherein the steering limit data is first steering limit data for a first operational domain of the autonomous vehicle, the actions further comprising generating second steering limit data for the autonomous vehicle based on a second curvature function and a second curvature rate function defining a second path curvature and a second curvature rate for a second operational domain, the second curvature function different from the first curvature function and the second curvature rate different from the first curvature rate based at least in part on the second operational domain.

20. The non-transitory computer-readable media of claim 16, further comprising reducing a limit of the first curvature function in response to determining that a slope of the first curvature function at a first speed exceeds a value of the first curvature rate function at the first speed to produce a second curvature function, wherein the leading angle limit is based at least in part on the second curvature function.

\* \* \* \* \*